United States Patent
Campbell

(10) Patent No.: US 7,469,859 B1
(45) Date of Patent: Dec. 30, 2008

(54) TRANSPORTATION APPARATUS AND METHODS

(76) Inventor: Leon Edward Campbell, 1888 Puente Dr., La Jolla, CA (US) 92037

( * ) Notice: Subject to any disclaimer, the term of this patent is extended or adjusted under 35 U.S.C. 154(b) by 73 days.

(21) Appl. No.: 10/968,708

(22) Filed: Oct. 18, 2004

Related U.S. Application Data

(60) Provisional application No. 60/512,835, filed on Oct. 20, 2003.

(51) Int. Cl.
*B64F 1/00* (2006.01)

(52) U.S. Cl. .................................. 244/114 R; 114/261

(58) Field of Classification Search ............. 244/114 R; 405/303, 195.1, 11–12; 114/261, 264
See application file for complete search history.

(56) References Cited

U.S. PATENT DOCUMENTS

| | | | |
|---|---|---|---|
| 1,275,912 A | 8/1918 | Harding | |
| 1,753,574 A * | 4/1930 | Loth | 244/114 R |
| 1,813,986 A * | 7/1931 | Breeze | 244/114 R |
| 1,850,490 A | 3/1932 | Bahl | |
| 1,900,319 A | 3/1933 | Vermeulen | |
| 2,133,721 A * | 10/1938 | Seidman | 244/114 R |
| 2,430,178 A | 11/1947 | Kurfiss | |
| 3,325,124 A | 6/1967 | Barg | |
| 3,333,796 A * | 8/1967 | Bary | 244/114 R |
| 3,554,470 A * | 1/1971 | Dudley | 244/114 R |
| 3,572,619 A * | 3/1971 | Brown | 244/114 R |
| 3,599,589 A | 8/1971 | Busey | |
| 3,680,320 A * | 8/1972 | Goodboy et al. | 405/303 |
| 3,729,153 A * | 4/1973 | Wilde | 244/114 R |
| 3,791,080 A | 2/1974 | Sjoberg | |
| 3,913,336 A * | 10/1975 | Figari | 405/222 |
| 3,953,390 A | 4/1976 | Ceintrey | |
| 3,981,464 A * | 9/1976 | Dudley | 244/114 R |
| 4,218,034 A | 8/1980 | Magill | |
| 4,286,538 A * | 9/1981 | Matsui | 114/266 |
| 4,416,435 A * | 11/1983 | Szendrodi et al. | 244/114 R |
| 4,799,828 A * | 1/1989 | Georgii | 405/195.1 |
| 5,398,635 A | 3/1995 | Tellington | |
| 5,421,282 A | 6/1995 | Morris | |
| 5,441,217 A | 8/1995 | Novinger | |

(Continued)

FOREIGN PATENT DOCUMENTS

JP          52039283 A * 3/1977        ................. 114/261

(Continued)

OTHER PUBLICATIONS

"The california state military museum", http://www.militarymuseum.org/LongBeachAAF.html. Oct. 1, 2006.*

*Primary Examiner*—Rob Swiatek
(74) *Attorney, Agent, or Firm*—Gazdzinski & Associates

(57) ABSTRACT

Apparatus and methods for improved transportation functionality. In one aspect, the invention comprises an improved and highly integrated transportation apparatus adapted to bring a plurality of different modalities in close physical proximity for enhanced efficiency. One exemplary embodiment comprises a multi-level structure disposed in a substantially contained low depth body of water (e.g., bay) and proximate one or more land masses to facilitate service via rail, land vehicle, ships, and ferries. Multiple long-length runways are also provided on the substantially planar top surface to accommodate air traffic. A monorail or similar system is also employed to allow ready movement between the various transportation interfaces.

16 Claims, 13 Drawing Sheets

U.S. PATENT DOCUMENTS

| | | |
|---|---|---|
| 5,584,118 A | 12/1996 | Furukawa et al. |
| 5,906,171 A | 5/1999 | Kristensen et al. |
| 6,073,573 A | 6/2000 | Gruber |
| 6,196,151 B1 * | 3/2001 | Grant et al. .................. 114/266 |
| 6,315,243 B1 * | 11/2001 | Peterson ................. 244/114 R |
| 7,036,449 B2 * | 5/2006 | Sutter ......................... 114/264 |

FOREIGN PATENT DOCUMENTS

| | | |
|---|---|---|
| JP | 8164892 | 6/1996 |
| NL | 1018223 C | 9/2003 |

* cited by examiner

PERIOD OF RECORD
1945 – 1969
ALL WEATHER

TRANSPORTATION APPARATUS AND METHODS

This application claims priority to co-owned U.S. Provisional Patent Application Ser. No. 60/512,835 filed Oct. 20, 2003 entitled "TRANSPORTATION APPARATUS AND METHODS", incorporated herein by reference in its entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. FIELD OF THE INVENTION

The present invention relates to improved apparatus and methods for transportation including, inter alia, air transport.

2. DESCRIPTION OF RELATED TECHNOLOGY

Numerous types airports and air cargo facilities are represented in the prior art. For example, U.S. Pat. No. 1,850,490 issued Mar. 22, 1932 to Bahl entitled "airport" discloses a layout for an airport having a plurality of runways disposed at 90-degree angles to one another, and also some parallel to one another.

U.S. Pat. No. 3,325,124 issued Jun. 13, 1967 to Barg entitled "Closed Track Airport With Inlet Runways For Straight Instrument Landings" discloses a plurality of airport layouts having a closed, substantially circular outer runway.

U.S. Pat. No. 3,572,619 issued Mar. 30, 1971 to Brown entitled "Airport and Runway System Therefor" discloses airports that have their runways laid out so that they do not intersect. The runways are formed in centerline-aligned pairs and have adjacent ends that are spaced apart such that when one of the runways of the pair is used for incoming or landing traffic, the other runway may be used for departure traffic. The adjacent ends only of the runway are provided with short taxiways leading to a terminal ramp area. The landing aircraft proceed to the end of its runway and onto the taxiway and into the ramp area, and the departing aircraft proceeds by way of the taxiway to the adjacent end of a departure runway. The taxi distances both inbound and outbound are related only to the adjacent end of one runway. Since there is no need to taxi to the end of a runway, there is ostensibly less delay both in the air and on the ground. There is no intermix of landing and departing aircraft on a single runway.

U.S. Pat. No. 3,729,153 issued Apr. 24, 1973 to Wilde entitled "High Capacity Low Pollutant Airport Design" discloses an airport construction including a terminal area and a pair of generally parallel runways on opposite sides of the terminal area. Each of the runways has an end more proximate to the terminal area than its opposite end with the opposite ends extending in opposite directions from the proximate ends. Short or stub taxiways connect the proximate runway ends to the terminal area. Simultaneous aircraft landings and takeoffs are provided. Aircraft traffic is characterized as flowing from one end of the airport toward the terminal area and from the latter to the opposite end of the airport. The short taxiways ostensibly reduce taxi time and distance for both landings and departures and, in conjunction with the flow through aircraft traffic pattern, minimize air and noise pollution.

U.S. Pat. No. 3,953,390 to Ceintrey issued Apr. 27, 1976 and entitled "Process for preparing a composition for the surface of roads, airport runways and like surfaces and the products obtained" discloses a process for preparing a composition for the surface of roads, airport runways, canals, dams and the like surfaces, comprising mineral granulates coated with 4-12% by weight with respect to the weight of the granulates, of a binder consisting essentially of 93-96% by weight of fluxed coal pitch or fluxed coal tar and 4-7% by weight of a polymer or copolymer of vinyl chloride. The polymer or copolymer is first mixed rapidly in a mixer in the form of a powder with the granulates previously heated to a temperature of 120-160 degrees C. and the binder is thereafter introduced in the mixer in contact with the mixture thus obtained and the mixing of the composition is terminated in the conventional manner.

U.S. Pat. No. 4,218,034 to Magill issued Aug. 19, 1980 and entitled "Industrial and urban airport complex with special cargo-handling facilities" discloses an airport complex comprising a main multi-level passenger terminal having peripheral gates for the enplaning and deplaning of passengers and cargo. A cargo building which is disposed in close proximity to the passenger terminal greatly shortens the time factor which usually is involved in transporting cargo to and from the passenger terminal. The airport complex is designed principally to accommodate ultra large aircraft of the jet-propelled type and novel facilities are provided for routing enplaning cargo on a priority basis from an arriving jet to a departing jet through cargo-handling facilities which are disposed within the passenger terminal, and also for routing enplaning cargo from the cargo building to a departing jet through the passenger terminal, likewise on a priority basis. Novel facilities are also provided for routing deplaning cargo from an arriving jet to the cargo building for various subsequent distribution, as, for example, inspection at a customs station, a sorting station, and breakdown to a flight departure as enplaning cargo via the passenger terminal, or as terminating cargo for remote delivery in the environs of the airport complex. A principal feature of such complex resides in the use of a towline cargo-handling system which cooperates with a series of power-driven cargo conveyors which, in turn, cooperate selectively with elevator mechanisms whereby both enplaning and deplaning cargo may be routed variously, the entire system being computerized for programmed control thereof. Provision is also made for the handling of baggage, mail, freight, and other items.

U.S. Pat. No. 5,398,635 to Tellington issued Mar. 21, 1995 entitled "Floating airport" discloses a floating airport that consists of a multiple-deck structure floatingly supported by a plurality of independent hulls removably attached to the underside of the structure. A system of propulsion jets is provided on all sides to permit the motion of the structure in any desired direction relative to the water. The anchoring of the structure is achieved by dynamically monitoring the horizontal position of its center of gravity and by utilizing the propulsion system to avoid any significant movement with respect to a predetermined location. The structure is allowed to rotate approximately around its vertical axis in order to align the runways with the prevailing winds and minimize the winds' impact on its stability, and any translational motion of the center of gravity of the airfield with respect to the water surface is minimized. As a result of this position control strategy, the structure is prevented from ever acquiring significant linear momentum in spite of its large mass and its position can be continuously controlled with relatively minor adjustments that are within the capability of its propulsion system.

U.S. Pat. No. 5,441,217 to Novinger issued Aug. 15, 1995 entitled "Variable one way airport" discloses an airport structure for operating aircraft in one direction during landing, taxiing and take off in short, efficient distances. The aircraft lands on an approach runway connected to an apron. It then taxies across the apron in generally the same direction as on the runway. It departs on a runway located on the opposite side of the apron from the approach runway. Both runways are in parallel and the runways are spaced laterally in distance equal to the width of the apron. The taxi distance is the shortest possible distance measured directly between the two runways in a linear, noncircular dimension. The apron is unobstructed in this dimension by the runway connections defining the taxi passageway path between distributed aviation buildings on the apron rather than the buildings being grouped together so as to obstruct straight taxi paths. The airport members allow reciprocal path direction and the members can be duplicated around a common axis creating big airports without taxiways in the preferred configuration.

U.S. Pat. No. 5,584,118 to Furukawa, et al. issued Dec. 17, 1996 and entitled "Production control with centralized physical distribution control between storage and production cells" discloses a production control system is disclosed which comprises a plurality of processing apparatuses each thereof including a single cell or a plurality of identical cells, a storage for temporarily storing objects to be processed, a transportation facility for transporting the objects to be processed between the cells or between the cell and the storage, a plurality of cell controllers each thereof controlling each cell, a physical distribution control system for controlling the transportation facility, and a charge control system for issuing a transportation command to the physical distribution system in response to a request for sending in and a request for taking out from the cell controllers as well as a notice of completion of transportation from the physical distribution control system.

U.S. Pat. No. 5,906,171 to Kristensen, et al. issued May 25, 1999 entitled "Floating runway" discloses a floating runway for use at sea having a horizontal, top surface whereupon aircraft may operate during landing and take-off. A number of floating, releasably interconnected supporting section are connected to a number of bridge sections mounted alternately and consecutively in a longitudinal direction of the runway. The number of supporting sections and the number of bridge sections include ends, as viewed in the logitudinal direction of the runway having respective abutment portions adapted for mutual abutment for interconnection of the section. The abutment portions including cantilevered beam portions projecting away from mid portions of the respective sections as reviewed in the longitudinal direction thereof. The beam portions of the bridge sections include a lower surface and an upper surface of the beam portions of the supporting sections arranged the same distance from the top surface. The beam portions of the bridge sections are supported by the beam portions of the supporting sections via the beam portions of the bridge sections and carry only a portion of the weight of the bridge sections when the bridge sections are connected with the supporting sections, so that the weight portion provides an abutment force for ensuring the mutual fixation of the sections.

Despite the foregoing variety of different airport facility and cargo transportation solutions, none address the needs of a substantially urban area having a plurality of different transportation modalities, which is also constrained as to available land area for the facility. Furthermore, none of these solutions actually improve aspects of the ecology surrounding them.

SUMMARY OF THE INVENTION

The present invention satisfies the foregoing needs by providing improved transportation apparatus and methods for its operation and construction.

In a first aspect of the invention, an improved transport apparatus is disclosed. In one embodiment, the apparatus generally comprises a substantially multi-leveled structure and a plurality of transportation options including fixed wing air transport; wherein the air transport is substantially performed using the top surface of the structure. The apparatus further comprises a substantially rectangular structure having multiple levels, including the top level having a plurality of runways disposed thereon. By virtue of its water-borne location, other types of transportation are also integrated into the structure including for example cruise ship terminals, a heliport, ferry terminals, and light rail and monorail systems.

In a second aspect of the invention, an integrated transportation apparatus is disclosed. In one embodiment, the integrated apparatus has a plurality of different transportation options disposed in a highly space-efficient and temporally efficient manner. This approach allows for maximum traveler and cargo throughput.

In a third aspect of the invention, an improved method of operating a transportation facility is disclosed.

In a fourth aspect of the invention, an improved method of manufacturing or constructing a transportation facility is disclosed.

In a fifth aspect of the invention, an improved method of doing business relating to a transportation facility is disclosed.

DETAILED DESCRIPTION OF THE INVENTION

Figure 1:
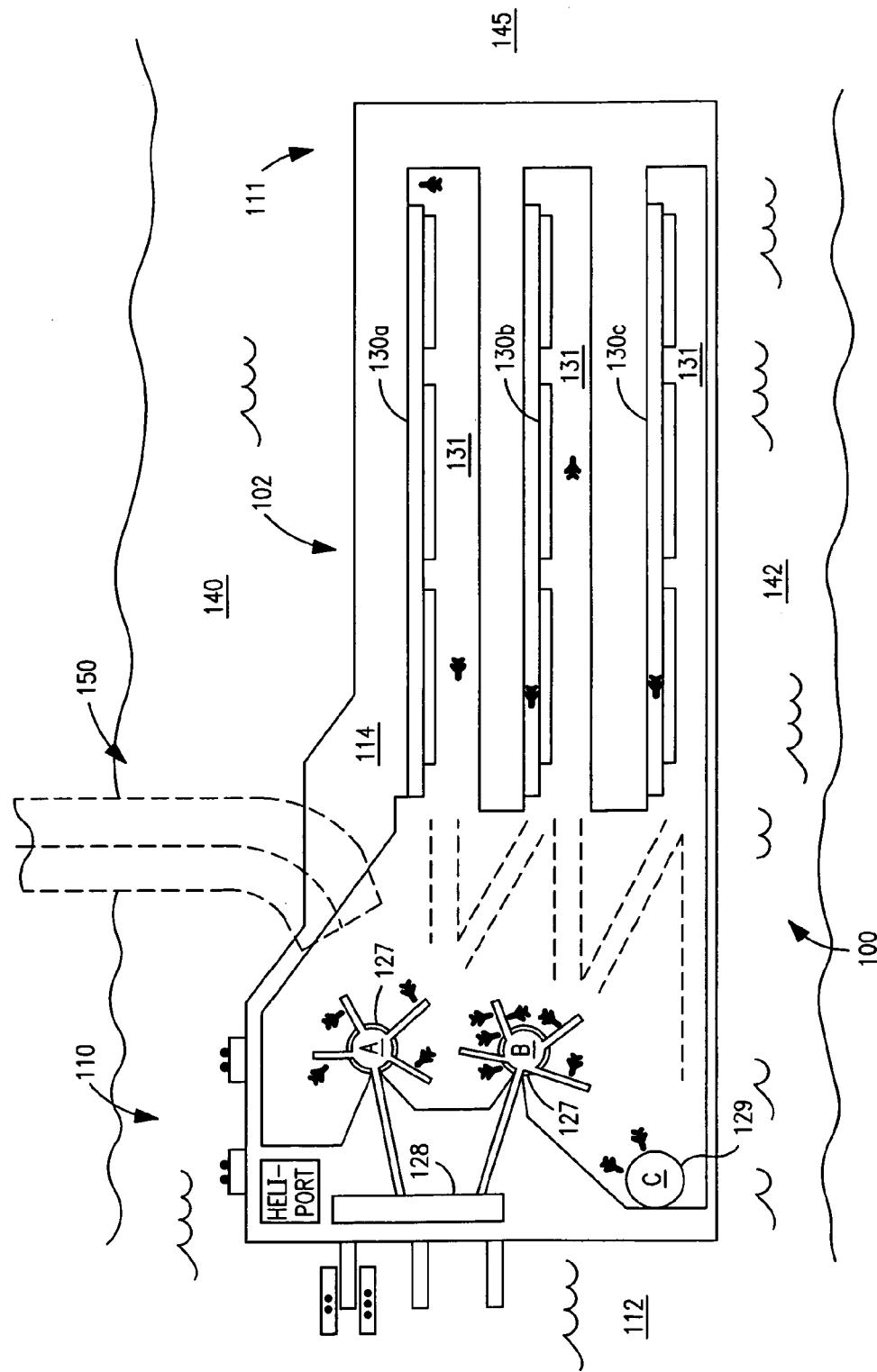
FIG. 1 is top elevational view showing a first exemplary embodiment of the transportation apparatus of the present invention.

Reference is now made to the drawings wherein like numerals refer to like parts throughout.

As used herein, the term "aircraft" includes any type of craft adapted for atmospheric or exo-atmospheric operations including, without limitation, fixed or variable wing jet or propeller-driven aircraft, helicopters, VSTOL craft, ramjet/scramjets, RPVs, inflatables/airships, weather balloons, gliders, and non-orbital (exo-atmospheric) spacecraft.

As used herein, the terms "ship" refers to any nautical or pseudo-nautical vessel or craft, regardless of size, whether surface or subsurface in its operation, adapted to operate on, in, or directly proximate to a body of water.

As used herein, the terms "rail" and "rail system" refer to any type of system adapted fro movement from one location to another via a substantially predetermined path including, without limitation, overhead or undercarriage monorails, bi- or tri-rail freight or passenger trains, mono-beams, trolleys, cable cars, Maglev (magnetic levitation) systems, and bullet trains.

As used herein, the terms "land vehicle" and "vehicle" refer generally to any type of vehicle adapted to traverse over land including, without limitation, automobiles, trucks, vans, carts, buses, motorcycles, bicycles, and mopeds.

As used herein, the term "transportation" refers to any transportation, regardless of modality, of any object, information, or living being, including without limitation aircraft, ship, rail, or land vehicle.

As used herein, the term "network" refers generally to data or communications networks regardless of type, including without limitation, LANs, WANs, intranets, internets, the Internet, cable systems, satellite networks or DBS, and Virtual Private Networks (VPNs). Such networks may utilize literally any physical architectures (e.g. ATM, IEEE-802.3, X.25, Token Ring, SONET, 3G, Hybrid fiber-coax (HFC), etc.) and protocols (e.g., TCP/IP, HTTP, FTP, WAP, GPRS, RCP/RTCP, etc.).

As used herein, the term "client device" includes, but is not limited to, personal computers (PCs), whether desktop, laptop, or otherwise, personal digital assistants (PDAs) such as the Apple Newton®, "Palm®" family of devices, handheld computers, personal communicators such as the Motorola Accompli devices, J2ME equipped devices, cellular telephones, set-top boxes, or literally any other device capable of interchanging data with a network. Such devices may interface using wired or optical fiber mechanisms such as an IEEE Std. 802.3 Ethernet interface, Digital Subscriber Line (DSL), V.90 modem, DOCSIS modem, hybrid fiber-coax (HFC) cable, or alternatively via wireless mechanisms and protocols such as IS-95/CDMA-2000, Bluetooth™, IrDA interface, IEEE Std. 802.11(a) or (b), 802.15, 802.16, Wireless Application Protocol (WAP), GPRS, GSM, third-generation or "3G" systems, or any other of myriad data communication systems and protocols well known to those of skill in the communications arts. Creation of such computer programs is readily accomplished by those of ordinary skill in the programming arts, and accordingly is not described further herein.

Overview

As described in greater detail below, the present invention comprises an improved apparatus, architecture, and methods for transportation. In one exemplary embodiment, the apparatus comprises a transportation structure which is both optimally situated with respect to its surrounding topography, population and infrastructure, and which provides a highly integrated "hub" for a plurality of different modes of transportation including aircraft, rail, land vehicle, and ship. This integration of multiple forms of transportation within such as small area provides greatly enhanced revenue opportunities, and economies of scale in terms of fuel and time efficiency, as well.

The exemplary structure comprises a multi-level structure disposed within a low-depth body of water (such as a bay or lake) which is proximate to one or more local population centers. The multi-level structure affords excellent spatial density for the facilities provided within the structure (e.g., air transport, rail service, parking, shipping terminals, restaurants, etc.), including substantially reduced footprint and ecological impact within the body of water.

The exemplary structure is situated in a low-depth body of water to advantageously permit efficient and cost-effective dredging operations during construction, thereby mitigating construction costs and providing a minimal impact on local population centers and infrastructure. Conversely, the structure is specifically located near population centers for, inter alia, ready access by the local population and access to local infrastructure such as freeways and surface streets.

A plurality of high-capacity runways, as well as a coordinated system of taxiways and ramps, are disposed on the top surface of the structure, thereby providing a maximal throughput for air traffic. Both passenger and cargo terminals are also provided proximate to the runways/taxiways so as to minimize aircraft loiter and taxi times. Precision aircraft navigation and control apparatus is also utilized to maintain high safety margins.

Other advantageous features are also optionally incorporated into the structure including, for example: (i) optimized disposition of the structure with respect to prevailing winds for, and residential areas of, the local region; (ii) use of an underground tunnel which provides land vehicle and rail access which is basically invisible to the local population; (iii) adjacent waterborne traffic channels to permit unimpeded waterborne traffic flow in parallel with air operations; (iv) use of acoustic/aesthetic berms in peripheral regions of the structure to mitigate the noise and aesthetic impact of the site; (v) use of a mono-beam/monorail system within the structure in order to provide transportation between the various facilities and transport modalities; (vii) close virtual and/or physical coupling to local military facilities to permit unimpeded military operations and storage or/use by military equipment in times of national emergency, respectively; (viii) use of a tidal-driven electrical generating facility to power the structure and/or local grid; (ix) the use of intra-level elevator systems which can be used to move personnel, cargo, small vehicles, or even aircraft between the different levels of the structure; and (xi) encapsulation of local waste fill into the structure in order to preclude transportation of the fill to another location (and the cost associated with bringing in non-local, non-contaminated fill.

Furthermore, the apparatus of the present invention is highly modular in nature, thereby allowing for interchange of various functions based on changing needs.

Due to its highly integrated nature, the transportation apparatus of the invention is also well suited to cities or other population centers which do not otherwise have significant indigenous mass transit, or wherein such mass transit capability is not well distributed with respect to the population.

Transportation Structure and Apparatus

Figure 1A:
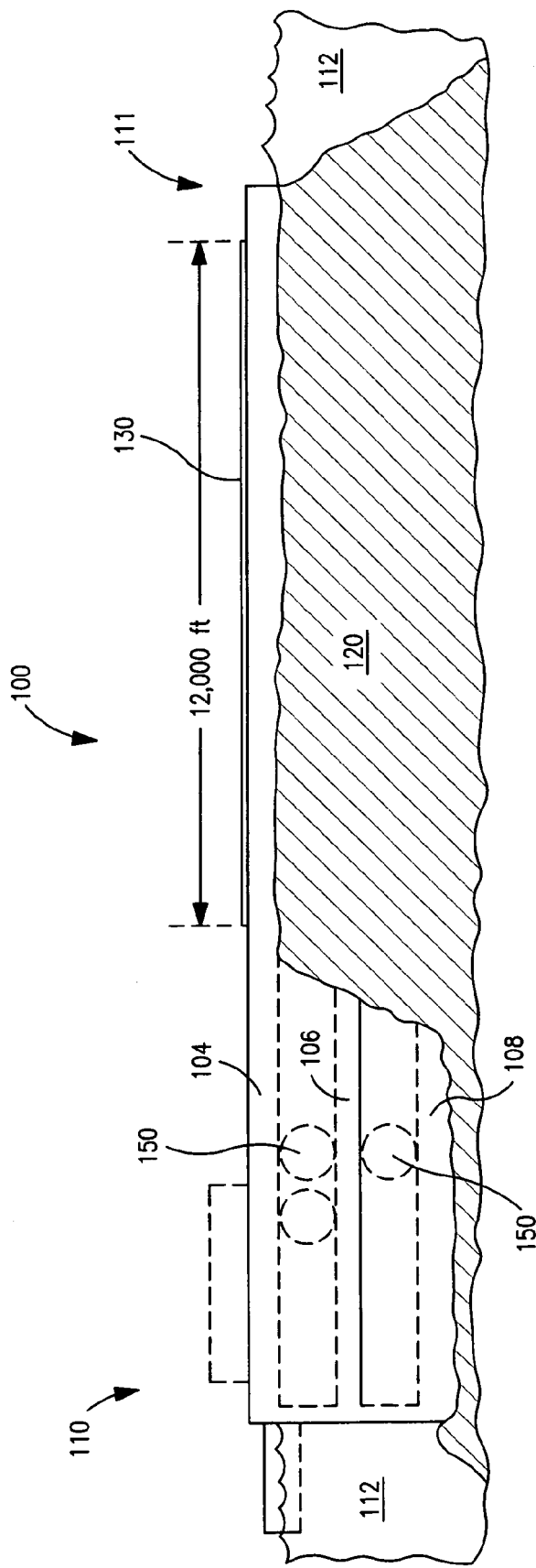
FIG. 1a is side elevational view showing the transportation apparatus of FIG. 1.
Figure 1B:
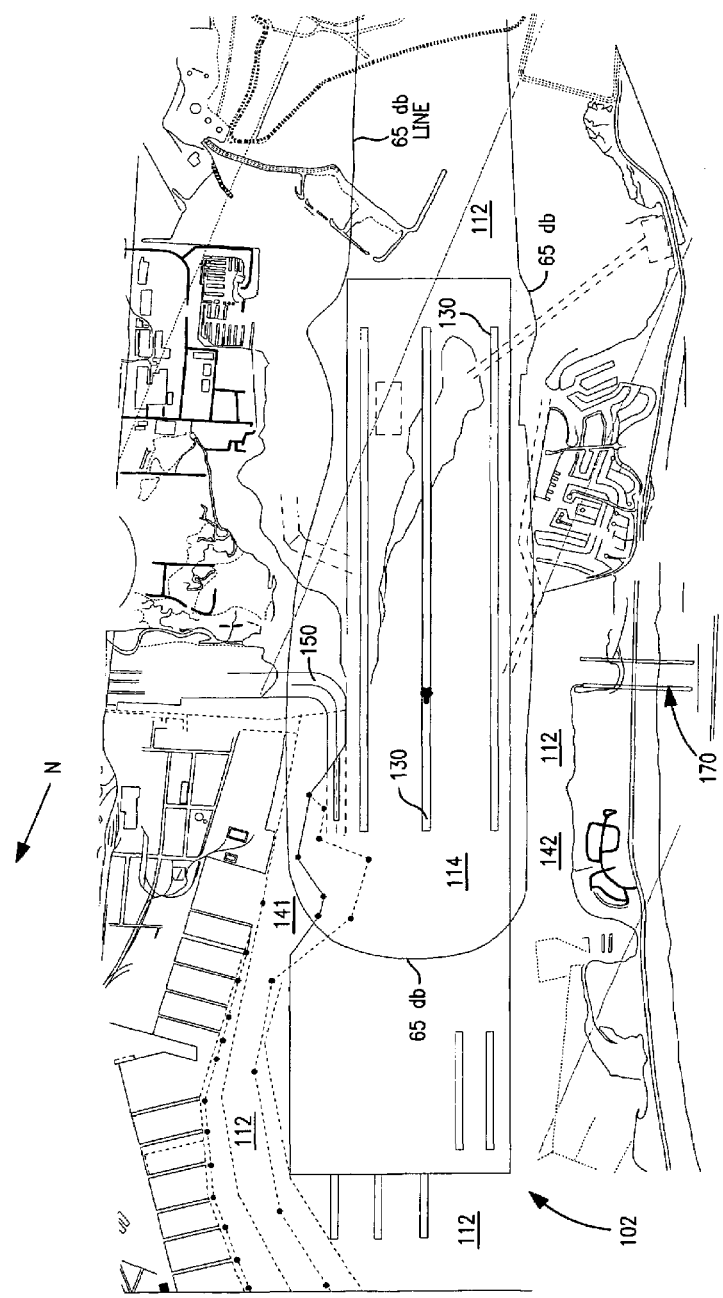
FIG. 1b is top elevational view showing the transportation apparatus of the invention disposed within one exemplary body of water and geographic region.
Figure 1C:
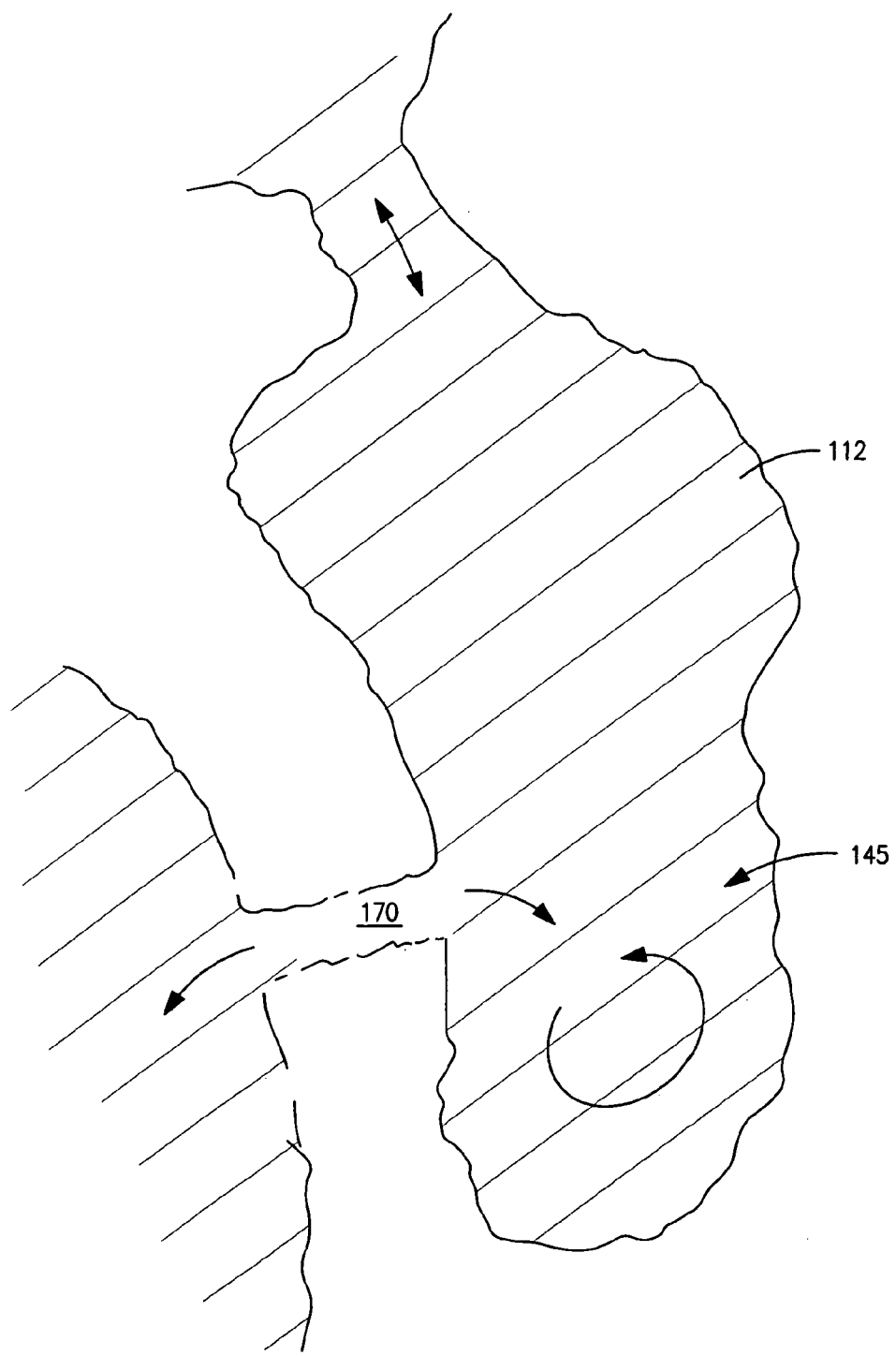
FIG. 1c is top elevational view showing the one exemplary body of water and geographic disposition in which the apparatus may be used.

Referring now to FIGS. 1-1b, a first exemplary embodiment of the improved transportation apparatus according to the invention is described in detail. It will be recognized that while the following discussion is cast primarily in terms of one particular exemplary geographic location (i.e., San Diego, Calif.), the apparatus and methods disclosed herein can be readily adapted to any number of other locations or applications within or external to the continental U.S., the exemplary location being merely illustrative of the broader principles.

As shown in FIGS. 1-1b, the transportation apparatus 100 generally comprises a substantially elongated and somewhat rectangular structure 102 having a plurality of levels 104, 106, 108 (e.g., three, although more or less may be used) coextensive with at least a portion of the structure 102. As will be described in greater detail, the structure 102 is adapted to provide a plurality of different functions including vehicle and rail traffic ingress and egress, ship mooring and passenger ingress/egress, vehicle parking, heliport operations, and a variety of different amenities (including restaurants shops and other retail opportunities) for travelers or other individuals utilizing the transportation apparatus.

In the exemplary embodiment, the levels 104, 106, 108 are substantially co-extensive with one another, and disposed primarily at a first end 110 of the structure 102. As shown best in FIG. 1, the top level 104 of the apparatus 100 generally comprises a substantially planar top surface 114 dispersed at a first height relative to a surrounding body of water 112. In the exemplary embodiment, this surrounding body of water comprises the San Diego Bay, although will be appreciated that any number of different bodies of water may be used depending on the chosen location. The height of the top surface 114 in the illustrated embodiment is approximately 15-20 feet above mean sea level, although the top surface may be disposed higher or lower elevations (even to include those below local water level when an external wall of coffer dam is provided) depending on the desired attributes. The top surface may also be made marginally "crowned" if desired so as to aid in the dispersion of rainwater and other accumulations from the top surface 114. Alternatively, at least portions may be inverse-crowned or cupped so as to, inter alia, preclude significant aviation fuel spills from flowing into the surrounding waters.

The top level 104 contains, in the illustrated embodiment, a plurality of different terminal structures 127, 128, 129 for air travelers, air cargo, and ships. For example, an air passenger terminal 127, cruise ship terminal 128, and air cargo terminal 129 are provided in this embodiment, although others may be used. These terminals comprise raised structures which extend above the plane 114 of the top level 104, yet which also penetrate somewhat through the top level 104 to the second level 106 (and beyond if desired). These structures provide for passenger and/or cargo boarding and unloading onto the various aircraft and ships operating at the site 100. It will be appreciated that any number of different configurations and terminal layouts may be utilized consistent with the invention, including star, centroid, circular, linear, etc. shapes. Furthermore, a limited number of large terminals, or a plurality of smaller ones, may be used. A number of taxiways 131 are disposed proximate to the runways and leading to and from the various terminals, so as to facilitate rapid, near line-of-sight movement of the aircraft from the terminals to the runways. A large apron region 133 is also optionally provided wherein many aircraft, terminals, and various facilities (such as maintenance hangars, fuel storage tanks, firefighting equipment, etc.) may reside.

In the exemplary configuration shown in FIG. 1a, the illustrated multilevel structure 102 includes one level 106 adapted for automobile parking and adapted for traffic routing from one or more subterranean tunnel apparatus described below in greater detail. This level 106 is also optionally presented for cruise ship and ferry embarkation. The various levels of the structure are connected through a stairways, escalators, and elevator systems of the type well known in the art. It will be recognized that the order and number of levels may be altered consistent with the desired attributes, however. For example, in one alternate configuration, the structure 102 comprises only two levels which are made more expansive in the plane parallel to the top surface 114 (i.e., trading vertical height for lateral expansion). As yet another embodiment, different numbers of levels are used in different portions of the structure 102, such as where the end region immediately proximate the ship facilities 160 (discussed below) is made to have three levels, and regions closer to the runways 130 are made to have only two levels. Any number of different configurations will be realized by those of ordinary skill provided this disclosure.

Additionally, a third (optional) level 108 is provided within the structure 102 to provide rail ingress and egress via the tunnel 150 (described in greater detail below), as well as cargo handling facilities for the various transportation options. Many of the facilities physical plant and other support functions may also be disposed on this lower level 108, as well as additional parking, optional amenities, etc. In this fashion, a seamless interface is provided for cargo operations which are largely invisible to the passengers and other users of the facility. With rail ingress and egress below the parking and terminal levels, no mutual interference with these activities occurs as well.

It will be recognized that while the third level 108 of the exemplary embodiment is used for rail and land cargo interface, other approaches may be used as well, such as where the structure 102 comprises only two levels, and the aforementioned interface and cargo handling is performed in a different region of the same level (e.g., second level 106) form the terminals, parking, etc.

In yet another alternate embodiment, the multilevel structure 102 may optionally be configured so as to include an aircraft "hangar deck" (not shown) generally comparable to that of a modern-day aircraft carrier. This hangar deck may be disposed, for example, in otherwise unused regions of the structure's second level 106 immediately adjacent the northern end of the runways 130, or alternatively at the very southern end 111. Elevator structures similar to those on aircraft carriers (albeit substantially larger to accommodate at least reasonably sized aircraft) may also be utilized so as to provide direct aircraft movement between the top level 104 and the "hangar" level. This approach has the advantage of keeping at least some aircraft at the facility shielded from the elements during maintenance. On a less ambitious scale, smaller elevators and hangar facilities can be used for support vehicles (refueling trucks, luggage carriers, etc.), spare parts, and the like.

In yet another alternate embodiment, the foregoing hangar deck approach can be used in conjunction with passenger terminals, etc. which are also disposed at or below the plane of the top level 104, thereby giving the upper surface of the structure 104 a substantially uncluttered and effectively featureless form. This embodiment may be desirable where a very low profile facility is desired, such as to provide a substantially uninterrupted view over the facility by residents of nearby population centers. The control tower may even be disposed "off island" if desired, such as on the nearest shore, so as to further preserve this featureless appearance.

In the illustrated embodiment of FIG. 1, the second level 106 of the structure 102 which provides for vehicular access, parking, and a system for moving people (e.g., suspended monorail), is disposed below sea level. As is well known, approximately one-half of Holland is below sea level; hence, the technology needed to create such structures is readily implemented. The perimeter fill and seawall of this portion of the structure 102 are built to standards assuring absolute safety from water intrusion or breach of wall integrity including, for example, steel and reinforced concrete construction along with a broad fill barrier proximate to the lower level(s). Compartmented construction may also be utilized (including, for example, bulkheads and watertight doors) may also be employed if desired in order to mitigate damage to the structure in the unlikely event of catastrophic earthquake or other natural disaster (such as Tsunami). Furthermore. At least portions of the structure 102 can be made "smart"; e.g., with integral stress/strain sensors, seismic mounts, shock absorbing features, and even a computer-driven seismic mitigation system (i.e., to selectively dampen beats or constructive reinforcements in seismic wave motion). In the context of the exemplary San Diego site (FIG. 1b), studies have shown that this part of the Bay is free from significant seismic faults.

Parking is also provided on the second level 106 of the exemplary design. Parking capacity in the second level 106 is designed to be sufficient to meet all parking needs for the various travelers and patrons of the facility 100, although additional parking capacity on the third level 108 (if so equipped) may also be required. The lower levels 106, 108 are advantageously protected against inclement weather (and especially solar radiation which is particularly damaging in certain climates such as San Diego).

Figure 2A:
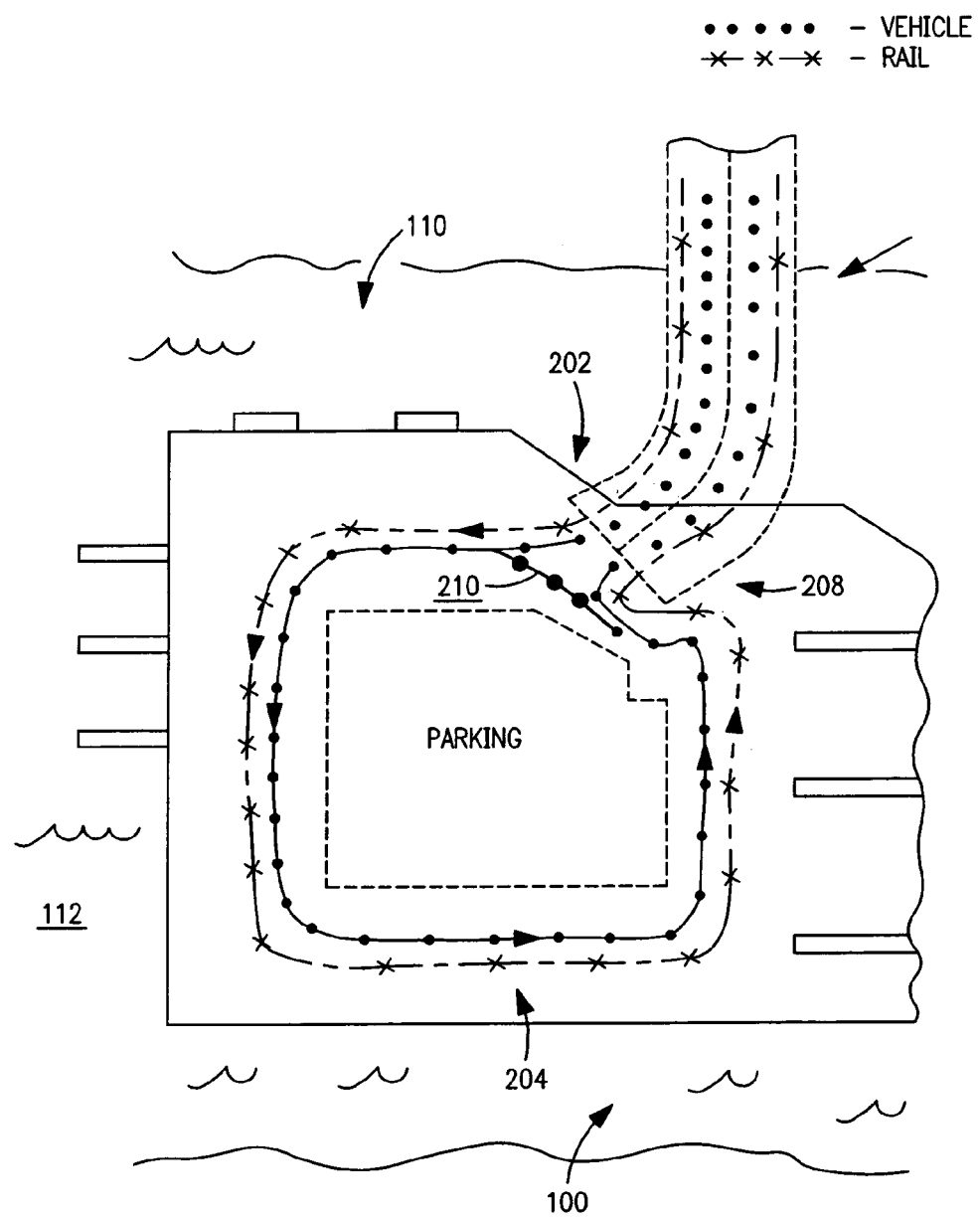
FIG. 2a is top elevational view showing an exemplary layout for the second level of the apparatus, including "looped" rail and vehicle pathways and tunnel interface.

The exemplary parking and vehicle circulation pattern (FIG. 2a) is adapted to facilitate the arrival and departure of persons at the air terminals, cruise ship terminal, and ferry terminals. In this embodiment, vehicle traffic ingressing to the structure at a first access point 202 is circulated around the periphery 204 of the second level 106 in a loop fashion, with parking and other facilities being disposed in the center of the loop. The various terminal access points are all proximate the loop, thereby providing for direct loading/unloading of passengers. The egress point 208 for the loop is proximate the ingress point 202, so that all traffic can utilize the vehicle pathways of the tunnel structure 150 (discussed below) in seamless fashion. A bypass 210 is provided between ingress and egress points thereby permitting vehicle operators to "orbit" within the structure 102 as opposed to parking, a practice commonly performed at most airports. In yet another configuration, the parking area is disposed at a distant area such as closer to the runways 130 (yet one or two levels below), and the travelers ferried to the terminals via a monobeam/monorail system or other dedicated transportation.

Air cargo facilities provided within the structure 102 are, in the illustrated embodiment, separated from the various passenger terminals. In this fashion, air cargo traffic will not conflict with the traffic of passenger airplanes. Sufficient air cargo space is provided to allow approximately 1.5 million annual tons of air cargo in this configuration.

The runway surfaces 130 are built over compacted fill in accordance with FAA requirements. The apron and taxiway areas 117, 119 are built partially over the lower level(s) 106, 108. Structural steel and concrete construction provides the necessary support for those portions of the apron and taxiway areas, although other construction techniques may be utilized.

The foundation 120 for the structure (including the substantially planar surface 114 of the embodiment of FIG. 1) is formed by dredging sand and other material from the peripheral region around the structure, as described in greater detail subsequently herein. The exemplary "island" of FIG. 1 has a footprint of approximately 1,980 acres. In the context of the San Diego Bay site, the total surface area of the Bay is about 14,951 acres, comprised of about 10,532 acres of water and 4,419 acres of tidelands. The footprint of the exemplary structure foundation 120 of 1,980 acres is 13.24% of the total area, and 18.80% of the water area, of San Diego Bay.

As illustrated by these numbers, the apparatus 100 of the present invention has a substantially reduced footprint with respect to the body of water which it is situated, and with respect to other generally comparable conventional or prior art installations. Specifically, by utilizing a multi level structure, and through efficient use of the runway planning, the footprint or square acreage consumed by the structure 102 is much less than would otherwise be required if all the facilities were disposed in a substantially uni-planar configuration. In prior art travel structures, for example, the runways are generally dispersed over a large area and comprise the only "structure" resident within a large block of area within the boundaries of the facility. This approach is often utilized since space is not at a great premium (more remote locations are typically chosen), and the costs of making a multilevel structure are generally prohibitive as compared to simply disposing the support structures (e.g., the terminals, restaurants, parking etc.) at locations away from the runways.

Another benefit associated with the illustrated embodiment of the transportation facility 100 relates to the absence of land acquisition costs. By being disposed within the navigable waters (and hence under Federal jurisdiction), no land need be purchased from private parties or cities in the area. This greatly reduces the cost and shortens the construction schedule, since no negotiations or other potentially costly or time-consuming activities associated with land acquisition are required.

The facility island or foundation 120 requires a substantial amount of fill. It is estimated that somewhere on the order of 34 million cubic feet of fill is required. As described in greater detail below, fill dredged from adjacent areas of the bay (and the tunnel structure 150) may be used to meet these requirements. In the exemplary embodiment, the dredged materials used to create the island include, in part, chemically low-level "contaminated" material. The U.S. Navy, in its expected dredging at the $32^{nd}$ Street Naval Station, will remove approximately 536,000 cubic yards of sediment, but only 268,000 cubic yards are deemed to be uncontaminated and suitable for ocean disposal. Although the contaminated sediment would otherwise be unsuitable if in water, the present invention advantageously utilizes such sediment to create portions of the foundation 120 or structure 102 where such sediment does not come into contact with water.

Figure 2B:
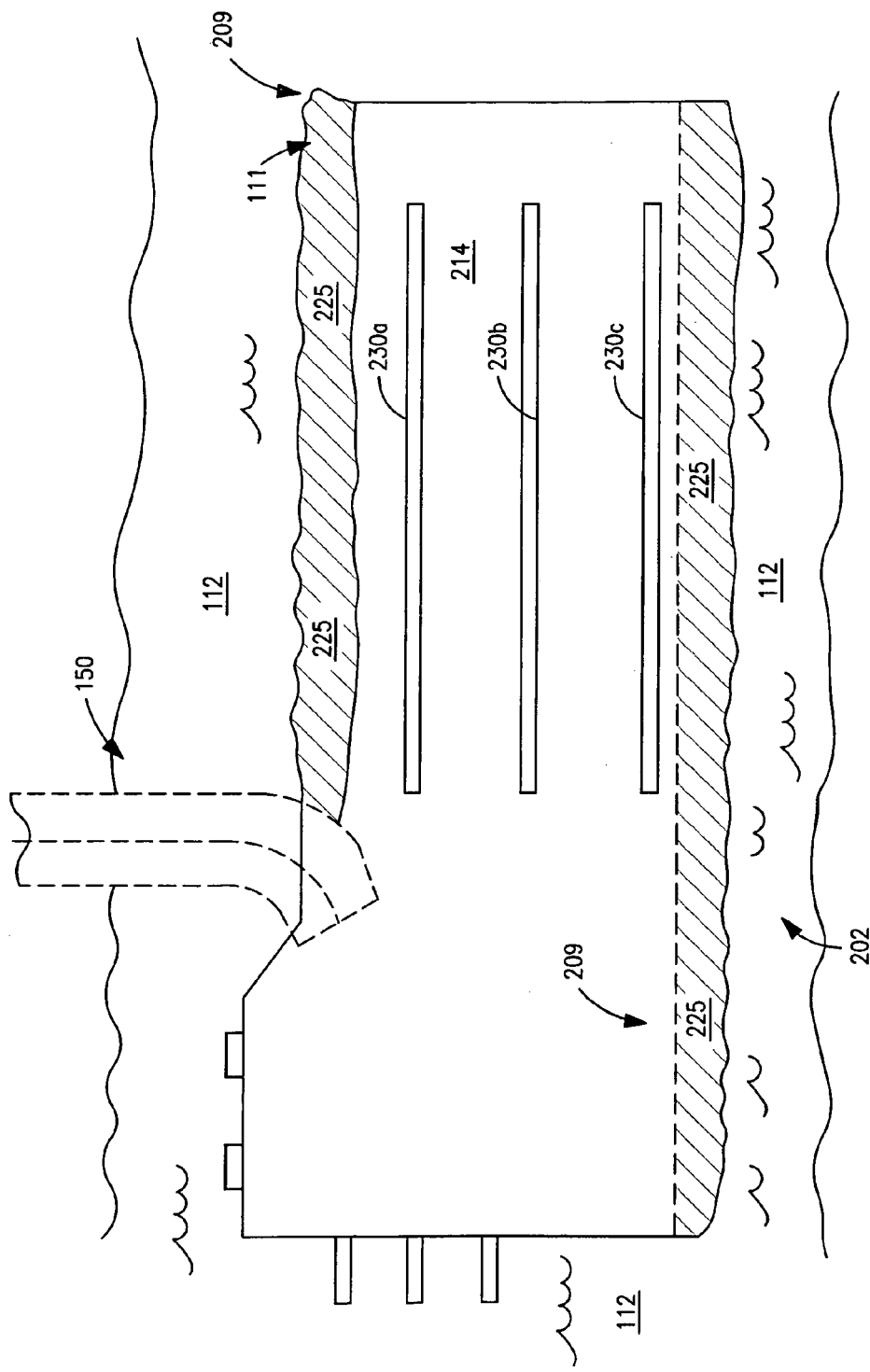
FIG. 2b is top elevational view showing yet another embodiment of the transportation apparatus of the present invention having a plurality of aesthetic/noise abatement berms disposed thereon.
Figure 2C:
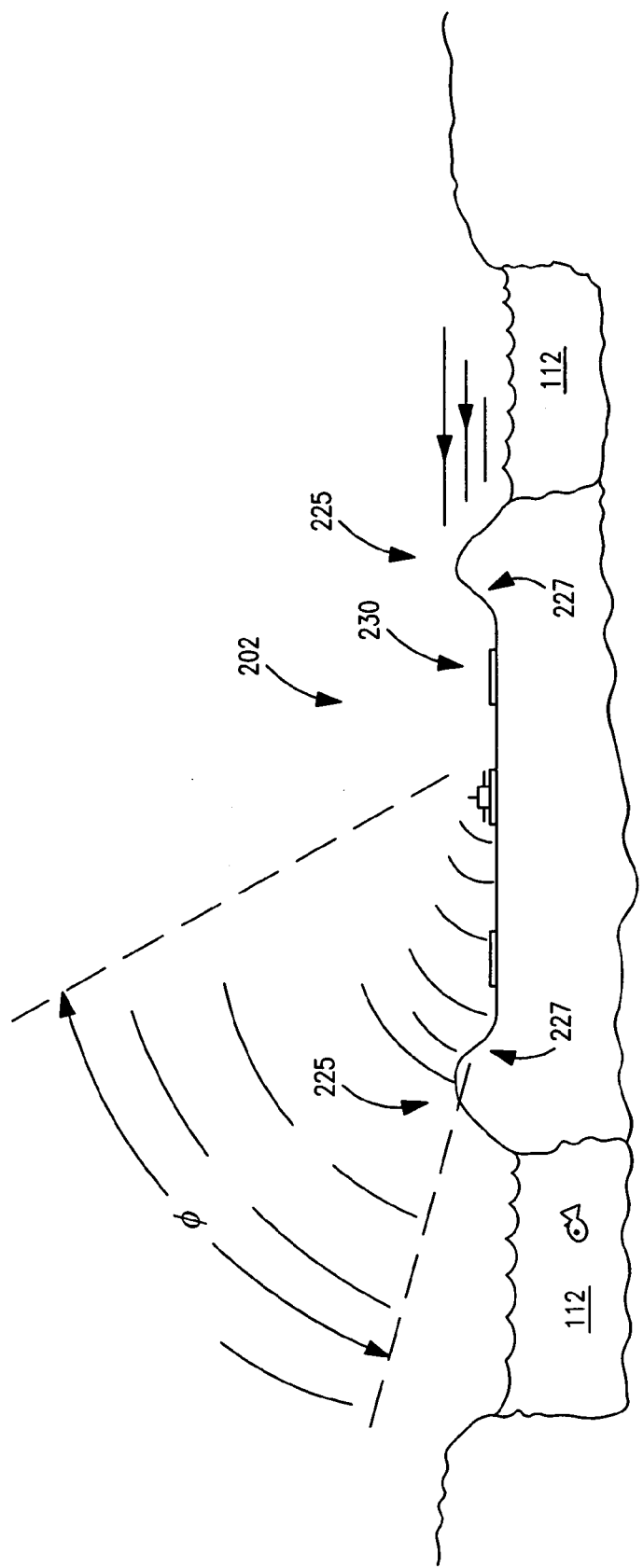
FIG. 2c is rear elevational view of the apparatus of FIG. 2b.
Figure 2D:
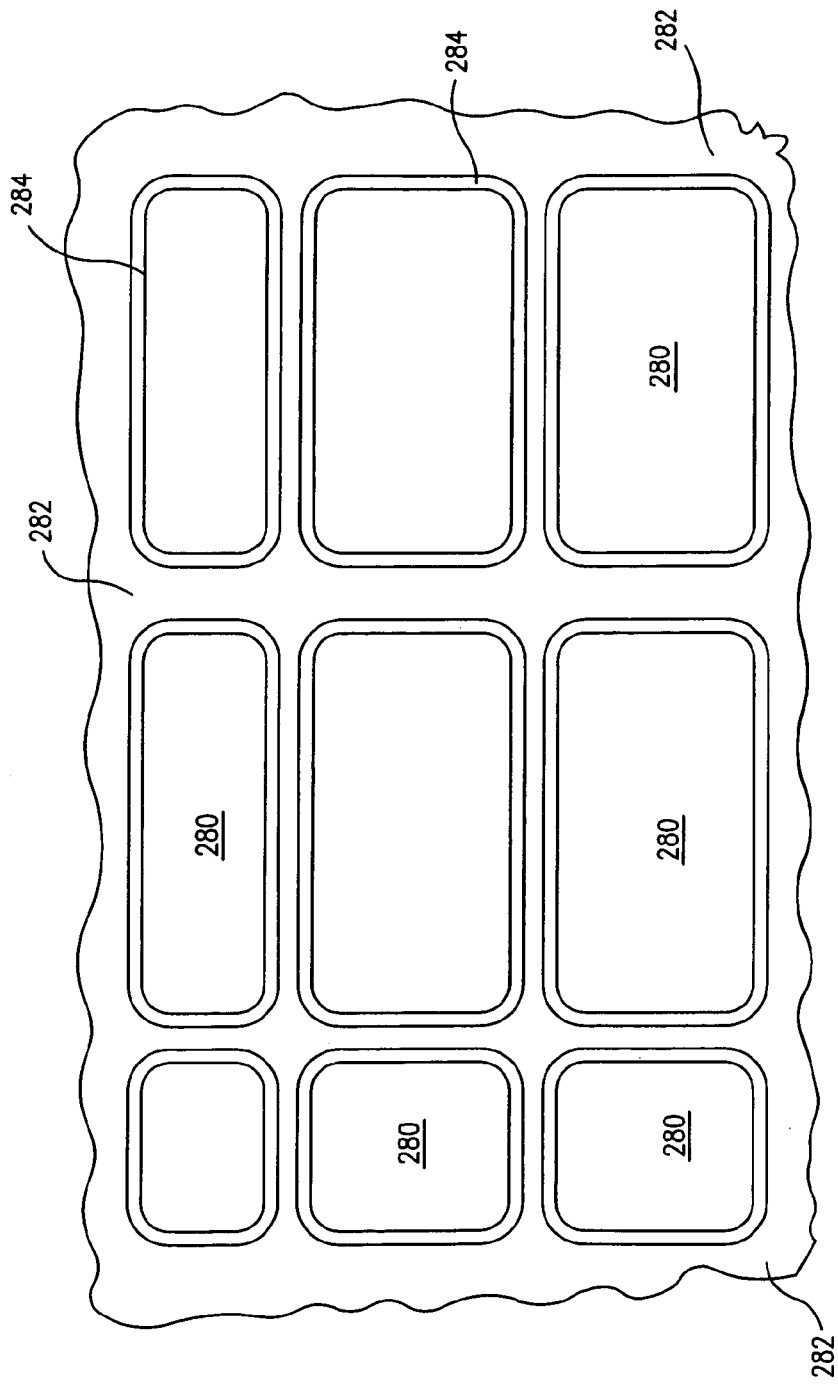
FIG. 2d is a top elevational cutaway view of a portion of the foundation underlying the runways of the apparatus of FIG. 1, showing optional encapsulated contaminated fill storage.

As shown in the exemplary structure of FIG. 2d, the contaminated fill 280 is in effect encapsulated within clean fill 282, concrete 284, etc. This approach has numerous benefits, including (i) relieving the local region of many million cubic yards of contaminated fill which must be disposed of otherwise at great cost; and (ii) much less cost on the importation of fill to the structure site, since the trucking in of clean fill is obviated; rather, fill is pumped in directly from dredging operations. Furthermore, using a modular or "honeycombed" arrangement such as the exemplar of FIG. 2d, additional seismic movement can potentially be accommodated, since the individual fill cells may absorb small amounts of movement and seismic or even thermally induced stresses.

Runways

As shown in FIG. 1, the top planar surface 114 of the structure 102 has disposed thereon three (3) substantially parallel runways 130, although it will be appreciated that a different number of runways (and non-homogeneous lengths) may be utilized consistent with the apparatus depending on factors including the type and the number of aircraft to be handled, etc. These runways, each 12,000 feet long, are referred to as the East 130a, Center 130b and West 130c runways. The length of each runway will accommodate the largest aircraft (both civilian and military) including the Boeing 747-40, C-17, and even the C-5A Galaxy with a nearly full loading (12,500 feet required for full-load takeoff). In the exemplary embodiment, the East and West runways are separated by 3,000 feet (centerline to centerline). The Center runway is separated by 1,500 feet from each other runway. To allow for even larger air carriers in the future or during times of war, space is reserved in the layout of the planar surface 114 and the top level 104 of the structure to extend the runways toward the first end 110 of the structure.

It will also be noted that in areas where the transportation facility 100 of the invention is placed that do not otherwise have large local airports, the capacity of the facility 100 to handle international flights based on the large runway length (12,000 feet) advantageously increases revenue for the facility. Specifically, the installation of an international-grade air facility reduces the need for travelers to go to other major airports before traveling to distant destinations. Hence, more local people wanting to travel internationally will come to facility 100, thereby increasing throughput and revenue.

It will also be recognized that the substantially parallel orientation of the three runways 130 in the embodiment of FIG. 1 provides significant benefits in terms of flight capacity and throughput. Specifically, the illustrated embodiment utilizes substantial separation between the individual runways 130a, 130b, 130c such that multiple aircraft can takeoff and or land in simultaneous fashion on adjacent runways (visual conditions permitting). This capability is also supported by an optional precision guidance and landing system of the type known in the aviation arts. Specifically, the precision system maintains the arriving/departing aircraft within a tight spatial pattern to avoid any potential for mutual interference. Utilizing precision radar monitoring systems in the present embodiment permits a separation of only 3,000 feet under FAA regulations, thereby allowing for independent, simultaneous operations using the East 130a and West 130c runways.

As another alternative, the aircraft on adjacent runways can be multiplexed in time such that two adjacent runways are alternatively used in rapid lineal or "pipelined" succession (i.e., the West runway, then the Central runway, then the East runway, and so forth). As an extension of this concept, the three parallel runways can also be used in non-sequential multiplexed fashion; i.e. the West runway, then the East runway, and then the Central runway.

Other permutations of the order and timing of runway use may be employed as well so as to provide the most efficient throughput and aircraft takeoff and landing density. For example, one type of aircraft can be selectively routed to one runway, while other are routed to another runway. Flow-control and vehicle/aircraft management techniques, e.g., those substantially akin to those used in network (e.g., ATM) packet flow optimization algorithms or other similar analyses, can be applied if desired to the management of the runways 130 and taxiways of the present invention so as to further optimize air traffic density and throughput.

The capacity for passengers afforded by the illustrated runway configuration is estimated at between 50 and 75 million annual passengers, the exact number determined according to the number of operations (operational density) and the passenger capacity of each type of aircraft. Specifically, it has been estimated that a 12,000-foot runway can handle 250,000 annual operations, and 100,000 operations can carry 10 million annual passengers. By these formulas, three 12,000-foot runways such as those of the structure 102 of FIG. 1 could handle 750,000 annual operations (75 million annual passengers). Appendix I provides an exemplary multi-runway analysis illustrating the uses of the exemplary runways to maximize their capabilities.

The primary air regulations are those administered by the FAA. The transportation apparatus 100 of the exemplary embodiment is designed to meet these requirements; see, e.g., Airport Design, FAA Advisory Circular 150/5300-13, Sep. 29, 1989. As previously discussed, the runways are separated by 1,500 feet (greater than the minimum required separation of 1,000 ft.) with a separation of 3,000 feet between the East and West runways, allowing independent, simultaneous precision instrument operations. The FAA also is concerned about any hazards to air navigation; see, e.g., Federal Aviation Regulations, Part 77, "Objects Affecting Navigable Airspace." The present invention 100, by virtue of its water-borne location and disposition, advantageously avoids any potential nearby hazards.

Surface Contour

It will be appreciated that while the illustrated embodiment of the travel structure shown in FIG. 1, et seq. has a generally flat (planar) top surface so as to facilitate easy landing and taxiing by aircraft as well as traversal by ground vehicles, other types of upper surfaces may optionally be utilized consistent with the invention. For example in one alternate embodiment shown in FIGS. 2b and 2c, the outer periphery 209 of the longitudinal sections of the top surface 214 of the structure 202 are formed into substantially berm-like shapes 225 which are also optionally made substantially aesthetic so as to provide a more natural and environmentally sensitive appearance to the structure 202 when viewed from either side.

This use of berm-like or similar shapes also advantageously provides enhanced noise dissipation from the standpoint that noise generated by the aircraft taxiing, taking off, or landing on the runways disposed between the berm-like structures is at least partly deflected at an oblique angle based on the contour of the interior regions 227 of the berm-like structures 225. Specifically, noise generated by the aircraft encounters the interior contour, at which point it is deflected upward into a solid angle which does not encompass any structures or landmasses immediately proximate to the sides of the structure 202. Furthermore, since no overhanging or elevated structures are present in the immediate proximity to the sides of the structures 225, very little if any of the deflected acoustic energy is reflected back downward to the proximate land masses (and hence residents thereof).

Additionally, the use of the berm-like structures 225 helps mitigate cross winds at the runways 230, which is especially helpful for smaller aircraft.

In terms of construction, the berms 225 can be made simply of fill dredged from the body of water and massed at the edges of the top planar surface 214 (or actually on the edges thereof). Small landscaping and other natural features such as sand beaches, lagoons/ponds, etc., can be disposed on the berms 225 as well, thereby enhancing the appearance of the structure 100 and permitting more natural integration into the local landscape. As shown in FIG. 2b, the berms 225 are disposed sufficiently far way from the runways 230 and have low enough elevation so as to present no navigation hazard whatsoever.

In the illustrated embodiment, the transportation apparatus is disposed such that its longitudinal axis resides in a substantially Northwest-pointing orientation. (i.e., an exemplary magnetic bearing of 325 degrees to the northwest and 145 degrees to the southeast.). In the context of the exemplary San Diego Bay site, this orientation advantageously both allows the transportation apparatus 100 to be situated in the Bay without movement or disposition of any housing land masses (or other interfering features), as well as providing inherent aviation-related benefits. Specifically, these benefits include orienting the longitudinal axis of each of the three runways 130 in such a way that it is substantially coincident with the direction of the stronger winds prevailing in the geographic area on a statistical/historical basis.

As will be readily appreciated by those of ordinary skill in the aviation community, runways 130 which are substantially co-linear with wind direction provide number of inherent benefits including enhanced aerodynamic or Bernoulli flow over the wings of any aircraft taking off into the wind, and the absence (at least on a statistical basis) of significant crosswinds which can make the aircraft less stable and more difficult to handle, especially at low altitudes. While the wind direction and magnitude on any given day cannot be accurately predicted, the travel apparatus 100 described herein tends to mitigate any such adverse affects through intelligent and well-considered choice of runway orientation. It will be appreciated, however, that the orientation of the runways, and hence the transportation structure 102, is flexible and may be altered to suit the particular installation.

Figure 2E:
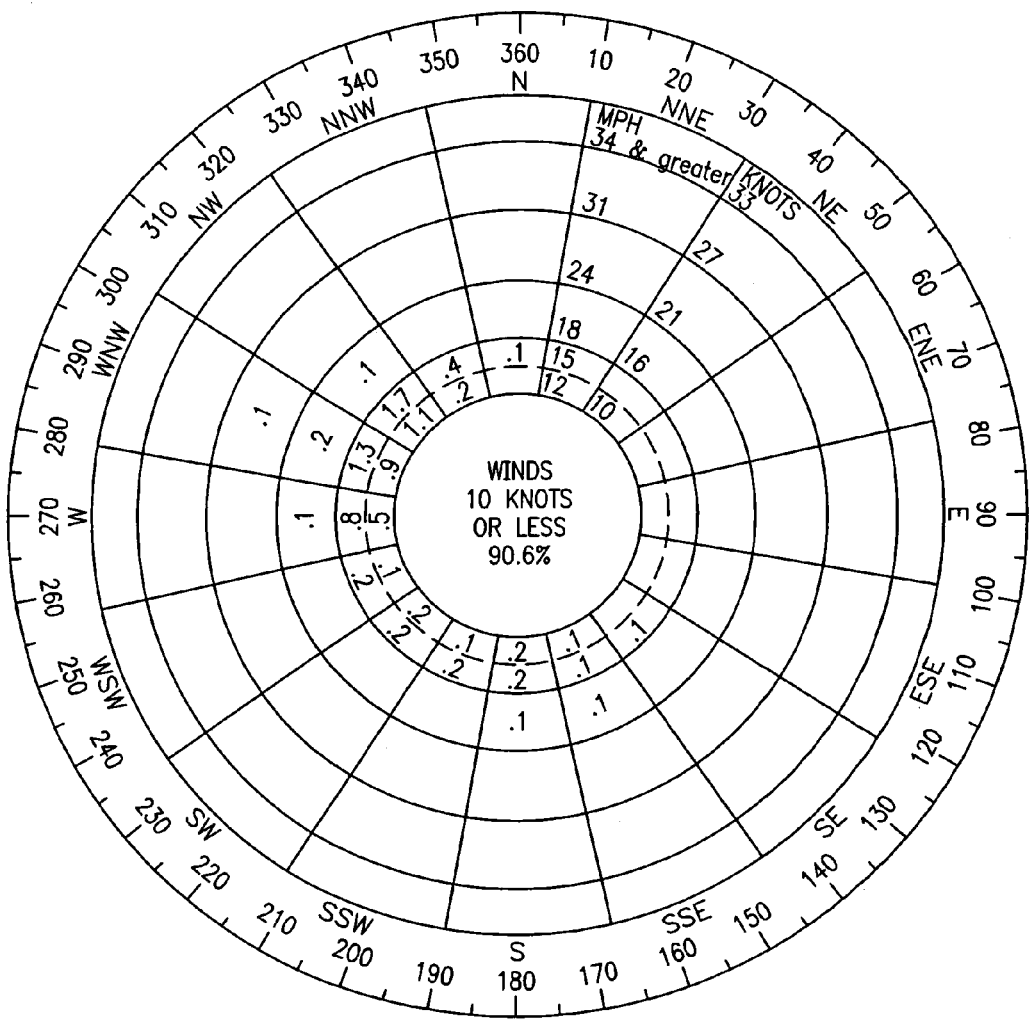
FIG. 2e is an exemplary (prior art) wind "rose" useful in evaluating runway disposition and orientation.

The wind patterns in the vicinity of an air facility over a given period of time is reflected in an aeronautical wind rose which shows the percentage of time any given wind velocity has been observed. In the context of the exemplary embodiment described herein, the experience at North Island Naval Air Station San Diego is considered comparable with respect to winds which can be projected in the area of South San Diego Bay. According to its aeronautical wind rose, covering the period 1945-1969 (See FIG. 2e), winds of less than 10 knots were experienced 90.6% of the time. The greatest wind velocity, 21 knots, was experienced only 0.1% of the time; Also, in the exemplary wind rose data of FIG. 1, the strongest winds were from a northwesterly direction, which is closer to the magnetic alignment of the runways 130 in the exemplary embodiment.

Figure 1D:
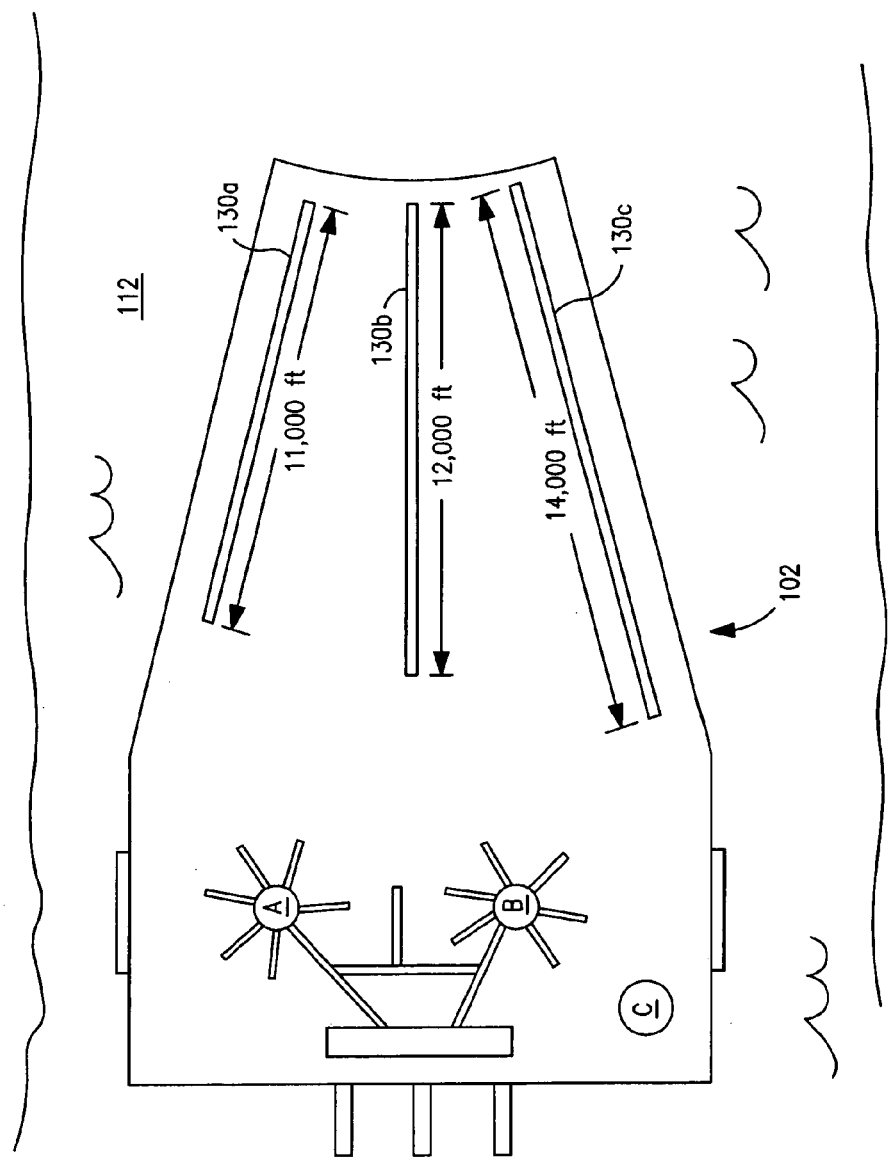
FIG. 1d is top elevational view showing a second exemplary embodiment of the transportation apparatus of the present invention.

It will further be recognized that while substantially parallel runways are shown in the illustrated embodiments, the runways need not be perfectly parallel, and in fact may be skewed along their longitudinal axes as needed. For example, in the alternate embodiment of FIG. 1d, the runways 130 are skewed or splayed relative to one another by approximately 10 degrees, and the shape of the structure 102 modified accordingly so as to accommodate the different runway geometry. Other skew values (which may be uniform or non-uniform as required) may be used as well. The runways may also vary in length (11,000, 12,000, and 14,000 ft. lengths as shown for example) in literally any number of different combinations or runway length, orientation, and relative skew.

Additionally, three runways need not be used, but rather more or less runways may be substituted as a trade-off for other attributes such as, for example, transportation apparatus 100 footprint, cruise ship mooring, acoustical profile, construction cost, etc.

As is well known, major airports are monitored for noise. Community noise contour maps are prepared annually. Depending on the type of aircraft taking off or landing, the contours are reasonably predictable. The FAA has a standard by which noise not exceeding 65 decibels is considered tolerable. Accordingly, another benefit of the present invention relates to the reduced noise contours provided by apparatus 100. Specifically, with the orientation of the runways 130 extending in both directions over a water body 112, radiated noise from aircraft does not impact any residential areas. In the exemplary San Diego embodiment, there is no noise above 65 decibels which would impact any residential areas including Coronado and inland. This underscores a very salient but subtle advantage of the present invention; i.e., the removal of so-called "night curfews" now in place on many prior art air facilities. Specifically, whereas prior art noise contours do impact residential areas and hence necessitate shutting air traffic down at night, the present invention is in effect free to operate all three runways (or, depending on the precise proximity and activities for a particular application, at least one runway) around the clock. This greatly enhances facility throughput and efficiency, most notably for cargo operations which are often conducted at night. Furthermore, local resident satisfaction is improved since their radiated noise exposure is advantageously mitigated.

It is further noted that the exemplary apparatus 100 of FIG. 1 (and more generally, irrespective of location) is further largely symmetric in terms of noise emission contours. As is well known, air facilities sometimes must reverse direction of takeoff and landings (e.g., roughly 5% of the time in the aforementioned Lindbergh prior art installation). Advantageously, the apparatus 100 produces noise contours (i.e., 65 db FAA line) which are almost entirely over water irrespective of direction of operations. This further enhances the flexibility of the facility; not only can it operate 24 hours per day, but in either landing/takeoff orientation.

It is also recognized that well known noise abatement profiles for takeoff (and even landing) may be used consistent with the facility in order to control the radiated noise contours. For example, the facility 100 and runways 130 are advantageously situated such that aircraft taking off in either direction can execute climb-out in most any direction, thereby in effect focusing their radiated noise in one direction or another.

Additionally, with such lengthy runways 130, less aggressive engine thrust reversal profiles can be utilized (i.e., each plane can coast longer without running out of either runway or accessible taxiway), thereby further mitigating noise from the facility 100 during operations. In fact, assuming that no other incoming or outgoing traffic requires that particular runway, this extended rollout is desirable, since it simply moves the aircraft closer to the terminals 127, 129 when landing in a typical orientation (i.e., Northwesterly)

In another aspect, the disposition and orientation of the apparatus 100 is selected such that the aircraft emergency patterns do not extend over any significant residential or populated regions. As is well known, many air crashes occur during either takeoff (predominant) or landing (less likely). For example, engine or control surface failure on takeoff can result in an uncontrollable aircraft, and catastrophic damage as the craft careens in to nearby population centers. The present invention substantially avoids this problem by providing takeoff and landing aprons 180 (FIG. 1) which are both disposed almost completely over nothing but water (and fairly shallow water at that). Contrast this with, e.g., the prevailing Lindbergh Field approaches and debarkation aprons (not shown), which both reside over significant population centers (e.g., downtown and Point Loma, respectively during normal operations). Hence, the insurance rates for carriers operating out of the exemplary facility 100 associated with damage to third parties as a result of an air catastrophe may also be mitigated in that any such event is highly unlikely to damage any significant population center.

Similarly, it is undeniably harder to "botch" a landing on a large and planar patch of area in the middle of a calm body of water than it is when avoiding natural or man-made hazards which plague so many prior art installations (including the aforementioned Lindbergh Field). With no mountains or other geography in the immediate approach or takeoff paths, the present invention arguably provides a much greater safety margin for pilots, especially in view of the eventual migration and adoption of pilotless vehicles now on the technological horizon. Stated differently, less skill is involved in landing and taking off from the present structure 102, thereby facilitating use of pilotless vehicles.

It is noted that irrespective of particular location, the disposition of the apparatus 100 of the present invention in a substantially closed body of water almost necessarily situates it between two coastal land masses. In the exemplary San Diego location, these masses comprise the "strand" region south of Coronado Island, and the Westerly Bay shore south of the $32^{Nd}$ Street Naval Station. This disposition between land masses (yet on water) provides myriad benefits including, for example, (i) ready tunnel/land bridge/small watercraft access from either of the shores; (ii) natural "calming" effect on the water body 112 which is substantially land-locked between the two masses; and (iii) potential wind barricading by the land masses. While not so limited, the apparatus 100 of the present invention is ideally situated between and in at least some proximity to such masses.

The foundation 120 for the structure (including the substantially planar surface 114 of the embodiment of FIG. 1) is formed by dredging sand and other material from the peripheral region around the structure, as described in greater detail subsequently herein. The exemplary "island" of FIG. 1*a* has a footprint of approximately 1,980 acres. In the context of the San Diego bay site, the total surface area of San Diego Bay is about 14,951 acres, comprised of about 10,532 acres of water and 4,419 acres of tidelands. The footprint of the exemplary structure foundation 120 of 1,980 acres is 13.24% of the total area, and 18.80% of the water area, of San Diego Bay.

As illustrated by these numbers, the apparatus 100 of the present invention has a substantially reduced footprint with respect to the body of water which it is situated, and with respect to other generally comparable conventional or prior art installations. Specifically, by utilizing a multi level structure, and through efficient use of the runway planning, the footprint or square acreage consumed by the structure 102 is much less than would otherwise be required if all the facilities were disposed in a substantially uni-planar configuration. In prior art travel structures, for example, the runways are generally dispersed over a large area and comprise the only "structure" resident within a large block of area within the boundaries of the facility. This approach is often utilized since space is not at a great premium (more remote locations are typically chosen), and the costs of making a multilevel structure are generally prohibitive as compared to simply disposing the support structures (e.g., the terminals, restaurants, parking etc.) at locations away from the runways.

Shipping and Water-based Modalities

Figure 3:
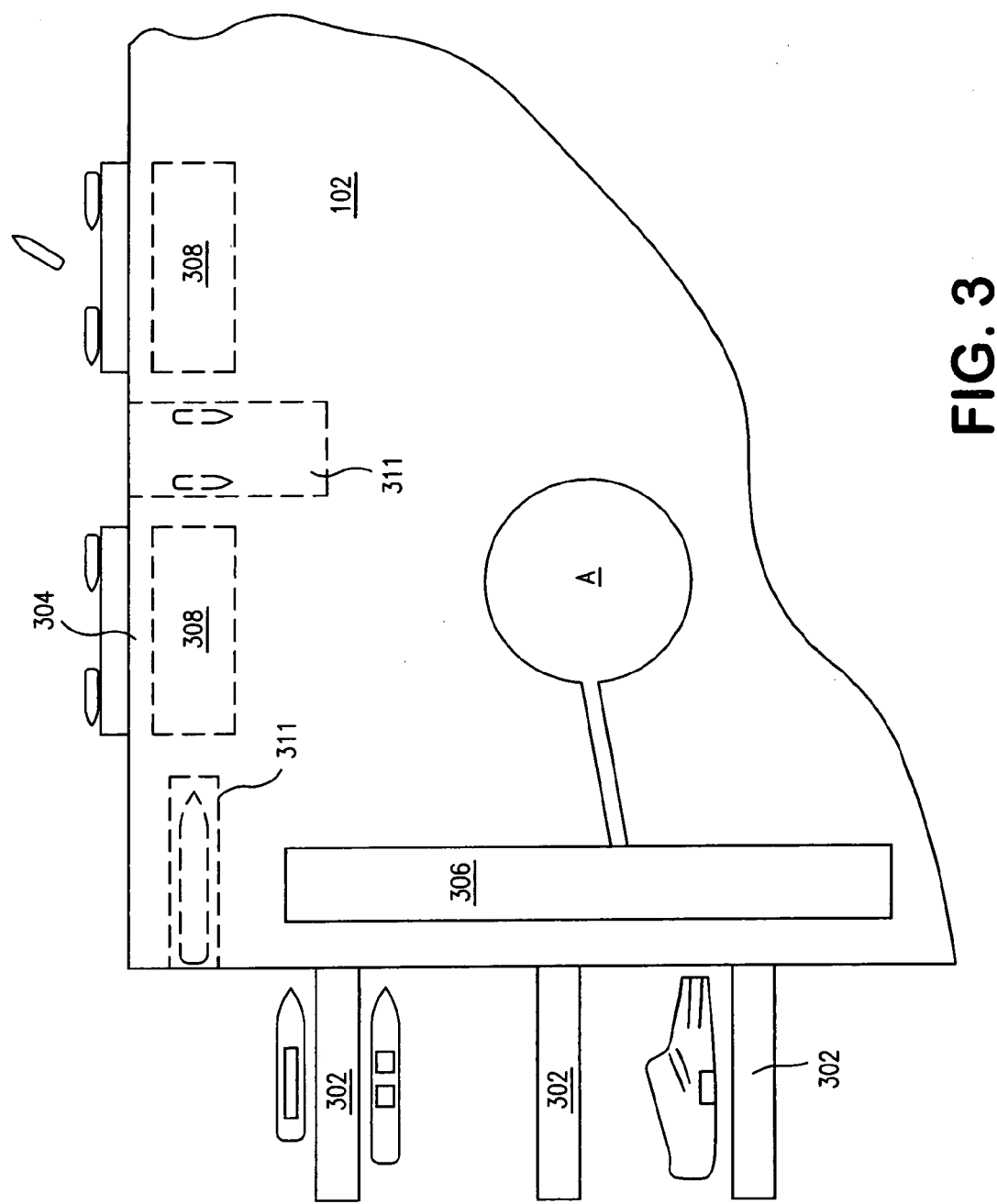
FIG. 3 is top partial elevational view of the apparatus of FIG. 1, showing a first exemplary embodiment of the shipping (e.g., cruise ship and ferry) facilities associated therewith.
Figure 4:
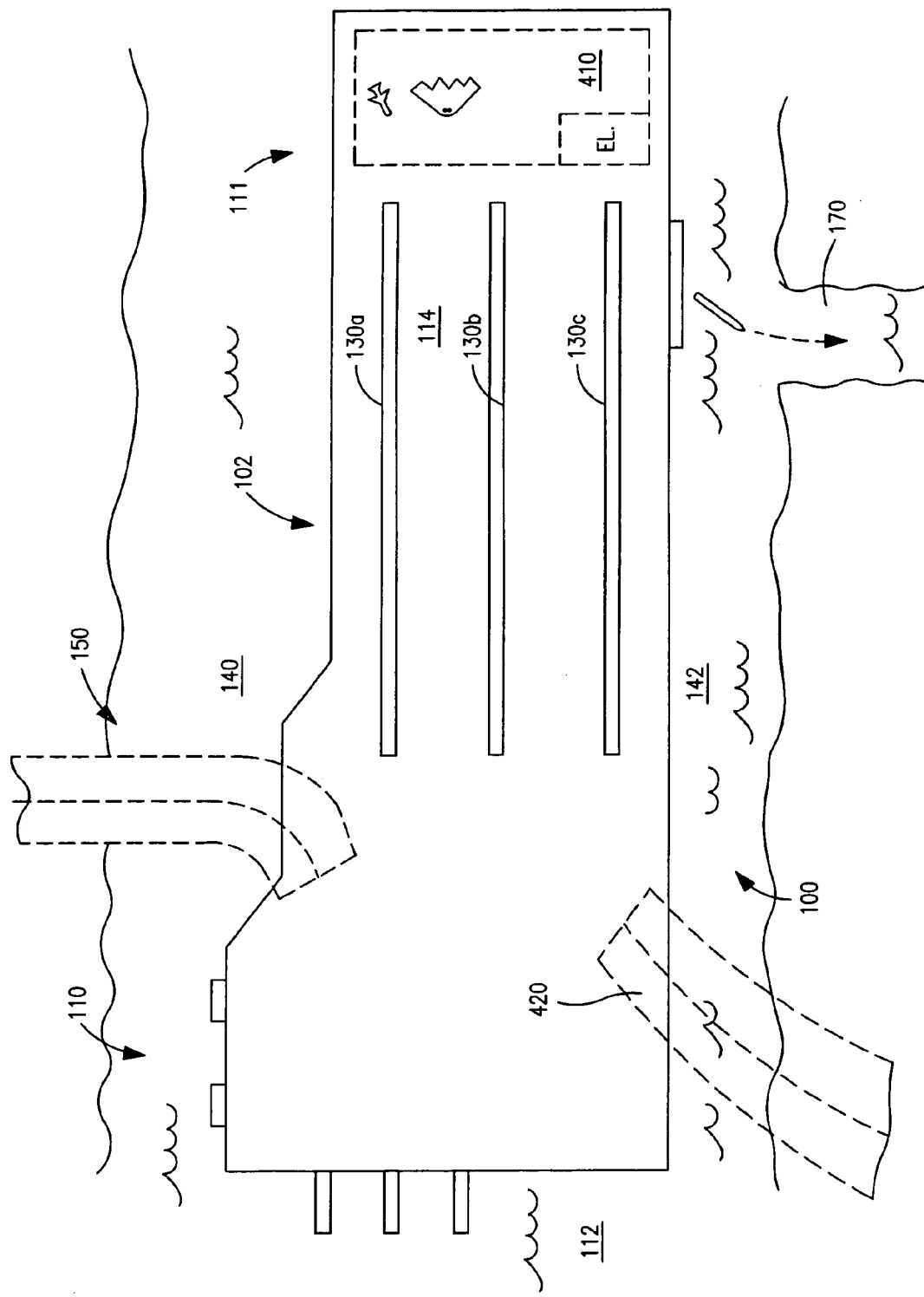
FIG. 4 is a top elevational view showing yet another embodiment of the transportation apparatus of the present invention, particularly adapted for military co-use and having optional hangar deck facilities.

Referring now to FIG. 3, the shipping related features of the exemplary apparatus 100 are described in detail. It will be recognized that while the exemplary embodiments are rendered in terms of cruise (i.e., pleasure) ships and ferries, literally any different kind of ship or watercraft can be used consistent with the invention including, without limitation, commercial or cargo ships, military vessels, and small personal watercraft such as jet skis, etc.

Specifically, as shown in FIG. 3, the exemplary apparatus 100 includes a plurality of both large ship piers 302, and smaller ferry piers or docks 304. Corresponding ship terminals 306, 308 are provided, and served by their respective piers. In the case of the large ship piers 302, each is approximately 1,500 feet long and 200 feet wide, although other configurations may be used. In the illustrated embodiment, as many as six cruise ships can be berthed at one time. The piers 302, 304 are arranged generally in a row, although other configurations may also be used. Recessed or covered ports 311 is also optionally provided for, inter alia, boarding during inclement weather, maintenance, etc. The recessed ports 311 can even be modified to accommodate vehicle traffic brought over from nearby landmasses for storage in the parking facility, or alternatively to offload wheeled cargo from the shipping piers 302 onto a ferry for local distribution.

Having ship terminals and moorings integrated into the apparatus 100 provides numerous benefits for facility and local region in which the apparatus is situated, as well as the cruise ship industry. The proximity of these shipping facilities to the air terminals makes the shipping terminal(s) suitable as a home port for cruise ships. It has been projected that a single cruise ship, having an approximate capacity of 1,800 passengers and making weekly cruises to and from a given home port, could inject roughly $100 million a year into the local economy. In many cases, the home-porting decision depends at least in part on the various amenities provided by that port, including proximity to other desirable locations, other travel modalities, costs, etc. Hence, the exemplary highly integrated arrangement disclosed herein optimizes many of these factors, thereby causing increased incentive to cruise ship lines to homeport in that region, and in fact at the facility 100 itself.

The shipping facilities of the apparatus 100 optimize the advantages of an integrated facility since cruise ship passengers will have immediate access to the airport and its facilities, including convenient transportation to and from local destinations.

In addition to the cruise ships, the apparatus 100 includes piers 304 and at least one terminal 308 for ferries or other more localized water transportation. For example, in one embodiment, high speed ferries are utilized to provide water-based access to and from the facility 100 from local population centers. In the exemplary configuration, these ferries comprise jetfoils (such as those built by the Boeing Company which attain speeds of 45 knots, and have been successfully used at, e.g., the Kansai Airport in Japan). Such ferries can provide an alternate means of commuting between the airport and selected stops in local region, potentially being faster in travel time between such stops than by motor vehicle.

Tunnel

In another aspect of the invention, the exemplary transportation apparatus 100 of FIG. 1 includes a largely subterranean tunnel structure 150 disposed proximate to the structure 102 and interfacing with one or more levels thereof. The tunnel structure 150 is in the present embodiment adapted to route traffic substantially underneath the first shipping channel 140 of the apparatus 100, although the tunnel may be routed in other fashions. Routing of the tunnel in such a fashion permits unimpeded yet simultaneous vehicle and rail traffic through the tunnel in addition to ship/watercraft traffic through the first shipping channel. Advantageously, the minimal depth of the body of water chosen for the exemplary embodiment of FIG. 1 makes excavation and maintenance of the tunnel very manageable, especially in comparison to more ambitious prior art tunnel projects such as the BART (Bay Area Rapid Transit) system in San Francisco, the Washington D.C. Metro system, and the European "chunnel" project. The technology for producing such apparatus are well understood by those of ordinary skill in the construction arts, and accordingly is not described further herein.

As will be appreciated, the tunnel structure 150 of the illustrated embodiment may be configured to handle one or more transportation modalities, including for example vehicular traffic, light rail (e.g., trolley), and even freight or other heavy rail if desired. The latter option may be desirable in the context of enhanced cargo efficiency; i.e., rather than having to offload cargo transferred by rail from a train at a first location, truck or otherwise transfer the cargo to the airport, and then load the aircraft, the intermediary steps of unloading and transporting are advantageously obviated. For example, using the freight elevator systems described elsewhere herein, a freight train entering the structure 102 via the tunnel 150 could be routed to a designated unloading area below the upper level 104 and proximate to a freight elevator, wherein the cargo (palletized, containerized, or other) can be efficiently offloaded once and transferred to a waiting elevator (or alternatively, a waiting local monorail/moonbeam system or vehicle for transport to the upper level 104). As yet another alternative, the rail cars can be routed to a shipping cargo terminal, wherein the cargo can be loaded on the cruise or other ships moored at the various mooring locations proximate to the first end 110 of the structure 102.

Overhead built in cargo handling rails or crane systems can also advantageously be provided within the second or third levels 106, 108 of the structure, such that rail cars or land vehicles can drive underneath the cranes, the latter engaging and lifting the containerized cargo off the vehicle. It can then be transferred directly to either the aircraft loading "side" of the rail (e.g., generally westerly within the structure 102 in the context of FIG. 1), or to the shipping side (e.g., generally north-easterly). This overhead crane or rail system further increases cargo handling efficiency, and reduces the need for land vehicles (such as trucks, carts, etc.) and their attendant disabilities including exhaust emissions, etc. Hence a cargo handling overhead rail system can be disposed in the third level 108 (or one portion of the second level 106) and simultaneously a monobeam or monorail personnel transportation system can operate within the facility 100 as well.

Furthermore, electronic scanning systems (e.g., X-ray, Gamma-ray, or neutron) can be installed proximate the cargo handling units such that the cargo offloaded is immediately scanned, or scanned during transit.

The foregoing configuration also has significant benefits in terms of Homeland Security, in that the elimination of intermediary steps of unloading, reloading, transporting, unloading a second time, etc. also eliminates many opportunities for surreptitious interference or tampering with the cargo. Rather, under the present embodiment, the cargo (which may be containerized or otherwise sealed for added security) is moved directly via tunnel and rail into a secure cargo-handling facility within the structure 102, and to waiting aircraft or ships. Hence, the risks and potentially the screening burden associated with such cargo could be significantly reduced, such cargo also likely qualifying under reduced scrutiny guidelines set forth by FAA or DHS. This results in lower shipping costs, and helps make the facility 100 attractive to shippers.

It is appreciated that the tunnel 150 disclosed herein may in actuality be compartmentalized or segmented in both vertical and horizontal dimensions (i.e., made into two or more sub-tunnels in over-under and/or side-by side array) so as to accommodate different types of traffic. For example, as described herein, one exemplary configuration of the facility 100 uses a third level 108 adapted for cargo handling and rail service. Hence, this level may be fed exclusively by a lower-tier tunnel (i.e., disposed below that used for passenger and other light vehicles serving the second level 106), thereby allowing unimpeded rail and cargo access to the third level. These sub-tunnels can also be made multi-mode; e.g., so as to allow side-by-side rail and truck access to the designated level.

It will further be appreciated that more than one subterranean tunnel structure may be utilized consistent with the transportation apparatus. For example, in another embodiment, two tunnels could be built, one on substantially either side of the travel apparatus structure 102. Myriad different routes and dispositions for the tunnel(s) can be utilized consistent with the invention.

As noted above, the highly integrated travel apparatus 100 (including the tunnel 150) provides significant benefits in terms of travel efficiency and coverage, especially in the context of cities with poor indigenous mass transit capabilities. Specifically, where no such integrated facility exists, travelers have difficulty transferring between different transportation modalities, thereby often necessitating yet other modalities (i.e., on cannot get from the cruise ship to the airport easily, hence they must take a cab or bus). Even direct access to the airport from a resident's home often necessitates a car trip, since no direct and timely public transportation exists. Especially during times of high travel (e.g., holidays), these added modalities can substantially clog the local areas freeways and surface streets.

In contrast, the apparatus 100 of the present invention advantageously eliminates many of these extra modalities, since many different forms of transportation overlap spatially (and temporally). Specifically, cruise ships are in direct proximity to aircraft, hence eliminating the cab or bus rides for thousands of cruise ship passengers. Similarly, the airport is directly proximate to a trolley embarkation point, thereby potentially causing dispersion of many vehicles from the structure 102 (i.e., many people would rather take the train to the airport than drive, and hence they would leave their cars at the train terminal off-site rather than at the airport.). Similar logic applies to the other modalities present at the structure 102 including, e.g., ferry boats, helicopters, etc.

Facility Security

In addition to the foregoing features, highly sophisticated monitoring systems of the type known in the art (e.g., ultrasonic, underwater sonars, millimeter wave/radar systems, etc.) may be utilized to detect movement both below and above the surface of the water 112, in effect providing an "electronic moat" around the site 100. It is noted that the disposition of the facility 100 within the substantially closed body of water 112 also aids in maintaining a controlled security perimeter around the facility; in the exemplary application (San Diego), these waters are very regularly monitored and patrolled by harbor police and the military. Specifically, the Joint Harbor Operations Center, a cooperative effort between the Coast Guard, Navy, and Harbor Police that includes computerized systems (i.e., radar, video, thermal, and sonar) and more traditional human-based surveillance systems, is used as one key basis for facility security in the present embodiment.

The foregoing underscores yet another advantage of the facility 100 of the illustrated embodiment; i.e., increased security for flight and shipping operations by virtue of (i) being disposed within a substantially closed body of water; and (ii) being disposed within a highly monitored, secure area. Whereas most land-based airports (including the existing Lindbergh Field) include aircraft overflight paths which are largely over unsecured lands, the present apparatus 100 has most of its ingress and egress routes over water, and particularly over secured water space. Furthermore, the security perimeter around the facility 100 (and for that mater the body of water 112 itself) can be expanded or relaxed as need be.

Aquatic Features

In another aspect of the invention, the body of water 112 in which the transportation apparatus 100 is disposed is also optionally ported via a cut-through channel 170 (FIG. 1) to a nearby open body of water in order to both (i) facilitate access to and from the close body of water, and (ii) enhance natural circulation of water between the open and closed bodies. This access in effect provides a shortcut to the larger open body, which can be used by both local civilian and military populations if desired. This cut-through 170 is suitable for recreational boats and smaller commercial and military vessels. Alternatively, it can be expanded and made suitable for deeper-draft vessels if desired. An optional tunnel under the channel provide for vehicular and pedestrian traffic along the landmass into which the channel 170 is cut. In the exemplary San Diego embodiment, this second entrance to the Bay saves 12 miles in distance for boats in the South Bay to reach the ocean.

Furthermore, the channel connecting the open and closed bodies of water induces, whether by natural circulation or forced circulation described below, enhanced water interchange between the two bodies. This provides significant environmental benefit from the standpoint that a closed stagnant body of water is less desirable than one with free interchange to an open body of water.

A major concern in salt marsh areas is the need for improved flushing by tidal action; see, e.g., the 1992 Report, The Ecology of Tijuana Estuary, Pacific Estuarine Research Laboratory, incorporated herein by reference in its entirety. One effect of a second entrance or cut-through 170 is to improve the tidal flushing in the first (substantially closed) water body 112.

In the context of the exemplary San Diego Bay application, the southern-most portions of the Bay 173 comprise a shallow water, low-circulation region which has significant stagnation and pollution issues. It has been used over the years as a dumping ground for wrecked boats, refuse, etc., and does not provide a wholesome environment for either humans or animal/aquatic species. The cut-through channel 170 of the illustrated embodiment, however, substantially addresses this issue by increasing natural (or forced) circulation of water between the first body of water 112 and the second larger body, thereby in effect "flushing out" the stagnant portion 173 with fresh volumes of water. This natural circulation results from any number of drivers including tidal/gravitational effects, temperature and salinity differentials, ocean currents, etc.

In the exemplary embodiment, fill materials used for the foundation 120 of the facility 100 are obtained from the shallow southern region of the closed body 112. Advantageously, this use of fill from the shallows both (i) reduces cost of bringing in outside fill; and (ii) increases the opportunities for recreational and non-recreational navigation and operations, thereby offsetting the reduction in surface water area to create the facility 100. Hence, in a "consumed boating area" sense, the facility pays for itself by not using any additional acreage of usable boating or recreation water.

In one alternate configuration, a series of large circulation pumps are disposed within one or more locations in the first body of water 112 and utilized to complement the natural circulation previously described by creating a minute pressure or level differential between the two bodies of water. Specifically, the pumps may be situated near the cut-through 170 and operated periodically or continuously (such as to take maximum advantage of tidal variations) to aid in exchanging the two water volumes. As yet another alternative, a subsurface large diameter piping system may be utilized to in conjunction with the pump(s) to forcibly move water ingested at one point in one body of water to a location within or near the other body of water. Many such alternate approaches will be recognized by those of ordinary skill in the hydrodynamic arts when provided the present disclosure, all such variations falling within the scope of the claims appended hereto.

Tidal Driven Electricity Generation

In yet another aspect of the invention, the apparatus 100 further optionally includes a tidal driven electrical system which can be used to power any number of different functions including for example portions of the travel structure 102 itself, or even for sale back to the local electrical power grid. Such tidal systems well known in the electrical generation arts. For example, the ABB—manufactured tidal current system of Hammerfest Stroem, in Oslo, Norway is exemplary of this technology. This system generates on the order of 700,000 kilowatt hours of non-polluting energy a year, or enough to light and heat roughly 30 homes.

In the context of the exemplary embodiment of FIG. 1, the two peripheral marine passage channels 140, 142 disposed on either side of the structure 102 may be configured to substantially restrict water flow there through, such as through use of concrete submerged structures (not shown) which do not interfere with shipping traffic, yet increase the head loss associated with moving significant quantities of water there through. This restricted flow (i.e., the pressure differential created between the two sides of the restriction during tidal variations) can be used to drive high efficiency water turbines which are in turn connected to electrical generators.

In one embodiment, large (i.e., 30-40 ft. diameter) blades are used to take maximum hydrodynamic advantage of the slow moving water. These blades are affixed to turbines disposed on the bed of the water body 112 and adapted to generate electricity for the apparatus 100 and/or the local grid. In the exemplary embodiment, the water flows at about 5-10 feet per second for about 12 hours when the tide is rising through the channels 142, 144, pauses at high tide and then reverses direction. The blades on the turbines are further configured to automatically turn to face the current so as to require a minimum of operator attention and control.

As another alternative, an artificial lagoon approach can be used wherein locks or selectively moveable restrictors within one or both of the two shipping channels 140, 142 of FIG. 1 are used to effectively trap water in the contained portion 145 of the body of water 112 at high tide. When the tide goes out, gravity lowers the water level of the larger (e.g., oceanic)

body of water coupled to the other (i.e., non-contained) side of the channels 140, 142, in effect creating a differential pressure which draws the water through proximate turbines to generate electricity. The optional cut-through channel 170 described elsewhere herein may also be utilized for this purpose, either in combination or isolation with the foregoing.

The low-speed, large turbines of the exemplary embodiment described herein are ecologically desirable as well, in that they are silent and invisible from the surface, and both humans and biologics (fish, seals, etc.) can swim round them without significant risk of being harmed by the slowly moving blades.

Alternatively, other turbine configurations can be used. Furthermore, a magneto-hydrodynamic system of the type well known in the art can be used to generate an electrical current in response to charged salt water ions passing through a magnetic field generated within the channels 140, 142.

It will further be appreciated that the optional water circulation and tidal electricity generation systems described herein may be coordinated or combined in structure and/or operation. For example, the tidal generation system may be used to selectively capture water in the contained portion 145 of the first body 112, at which point this contained volume is pumped down, and then the channels reopened, in effect providing a "bleed-and-feed" scenario of the type well known in the concentration dilution arts. Also, components from one system may do double-duty within the other system. Myriad operational scenarios and structural configurations are possible.

Military Co-Use

In yet another aspect of the invention, the transportation apparatus 100 is adapted for coincident or anecdotal military use. Specifically, in one embodiment, the runways are adapted to accommodate the size and loading pressures associated with heavy lift military aircraft such as the C-5A and the C-17. This permits immediate conversion of the facility to military use in time of war. The aforementioned hangar deck configuration 410 may also be utilized to allow smaller aircraft such as military fighter aircraft, helicopters, etc. to be stored "below ground" as it were during such military use. Such hangar 410 may also be disposed near shipping piers (e.g., at the North end 110 in the illustrated embodiment) so as to facilitate ready transport of aircraft, munitions, etc. to heavier shipping.

Furthermore, one or more subterranean channels between the facility 100 and nearby military installations may be provided. For example, in one exemplary configuration of the exemplary San Diego Bay site, a second tunnel 420 may be built between the lower levels of the structure 102 and the nearby strand of beach connecting to North Island NAS. The tunnel may be used for, e.g., covertly shuttling materials to and from the structure in time of war, or storing military equipment such as small aircraft, munitions, and even personnel to protect them from attack. This second tunnel can pass below the second shipping channel 142, thereby allowing unimpeded access as with the first tunnel 150 and channel 140.

This secondary tunnel can also be used as an emergency egress in the event of catastrophe and/or destruction of the first tunnel 150, such as during a flooding or earthquake event. The two tunnels can also be directly or indirectly connected to one another if desired.

Method

Figure 5:
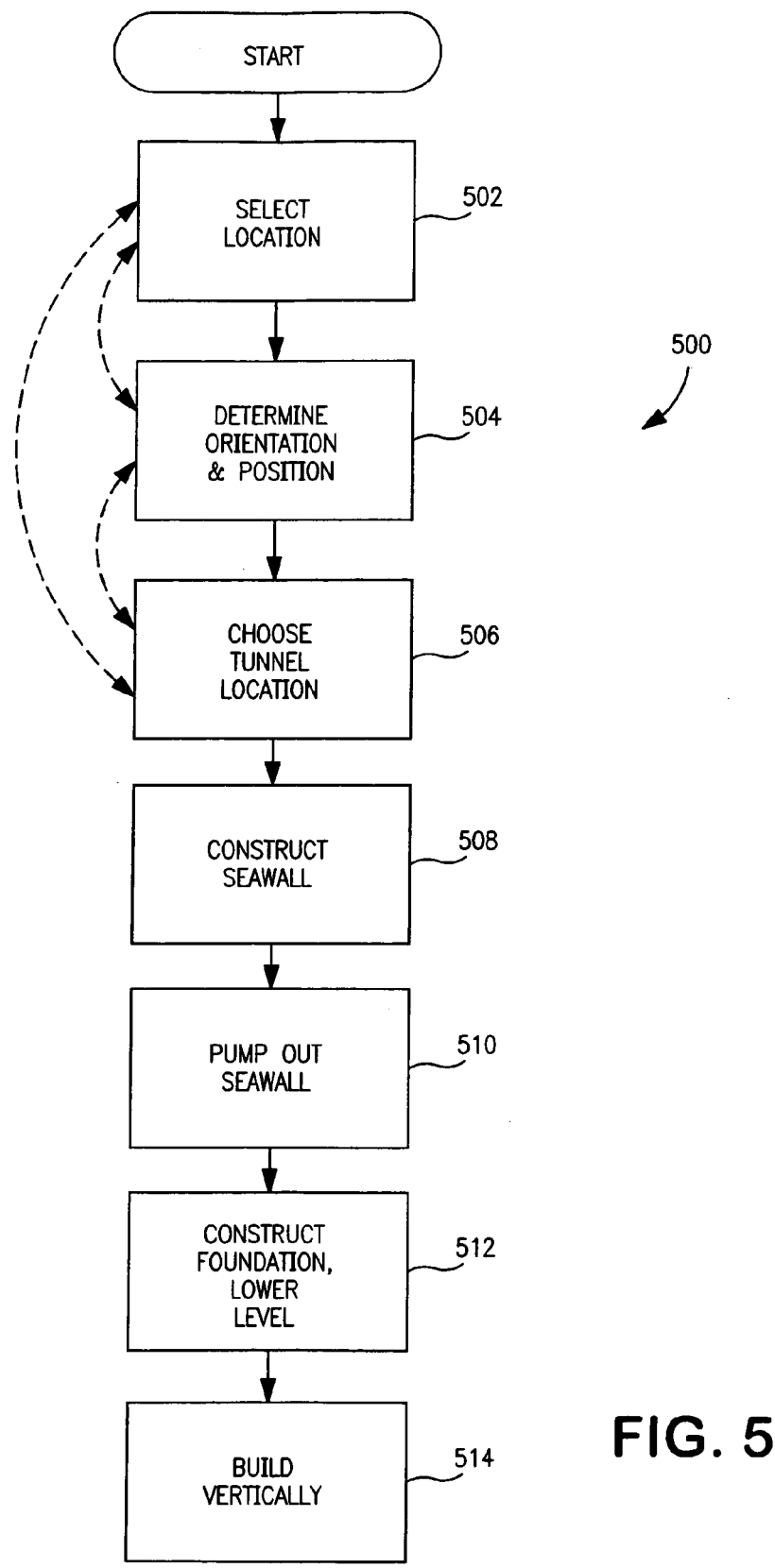
FIG. 5 is a logical flow diagram illustrating one exemplary embodiment of the method of constructing the apparatus of FIG. 1.

Referring now to FIG. 5, a method of manufacturing the travel structure described above is described in detail in the context of the exemplary water-borne site. The method 500 generally comprises first selecting a suitable location for the structure (step 502). As discussed above, various criteria may be included in the site selection process, including acoustic radiation profile, proximity to population centers and infrastructure, local natural and man-made navigation hazards, weather patterns, overflight rights, ecological concerns, economics of obtaining or leasing the property, etc.

Next, per step 504, the orientation and position of the structure is determined. Again, many of the foregoing factors may be used in this determination. For example, in the context of the exemplary site described herein, a substantially Northwesterly runway orientation is chosen based on, inter alia, local topology and features, as well as predominant historical wind direction patterns. Additionally, the "terminal" end of the structure 110 is selected as part of this step 504.

After the orientation and position of the structure is selected, the orientation and location of the tunnel(s) is chosen per step 506. This step is performed so as to facilitate the easiest and most effective interchange between the facility 100 and the other local transportation infrastructure including, e.g., local freeways, bridges, surface streets, rail lines, etc.

Since a portion of the foundation 120 will not need to be filled in, a perimeter of fill, together with a seawall, is next constructed (step 508). In the exemplary embodiment, at least part of this seawall comprises a coffer dam of the type well known in the arts, although other approaches may be used. Next, per step 510, water then pumped out to create a dry area for construction of the structure's lower level improvements, typically to about 10-20 feet below the surface of the water (for a two-level structure) and about 40-60 feet (for a three-level structure such as that of FIG. 1a). For the portion of the island supporting the runways, after the water is pumped out, fill would be placed.

Advantageously, through choice of a low-depth body of water 112 for siting of the facility 100, the hydrostatic pressure and engineering requirements associated with this evolution are mitigated, thereby making the method 500 more readily implemented. Utilizing fill in a bay for an airport is well known technology, having been used at, inter alia, Hong Kong International Airport. In one significant aspect of the present methodology, fill is optionally pumped directly from regions within the body 112 that are proximate to the coffer dam/seawall or other points within the structure where they will be utilized. Hence, an absolute minimum energy is used in disposing the fill, since only a very short distance exists between the point of origin (dredging) and location within the site where it is to be deposited. In one exemplary approach, a fill perimeter is established wherein a plurality of dredging and pumping sites are disposed periodically around the periphery of the site 100, thereby allowing sediment or other dredged matter to be obtained and pumped just a short distance. As discussed elsewhere herein, even the excavations for the tunnel 150 can be utilized as a portion of the fill for the site, thereby almost totally obviating the need for trucked (or trained) in fill or materials from an outside source.

As noted above, the process 500 also can selectively utilize contaminated fill (dredged and pumped in much the same way as other fill) which is either encapsulated or otherwise entrained within selected portions of the structure. For example, one exemplary configuration utilizes large vertical pockets or cells within the foundation structure which are first formed from uncontaminated material, and then later filled with contaminated fill material (see FIG. 2d).

After the various portions of the foundation and lower levels of the structure 100 have been made (step 512), the structure is built vertically upwards (step 514) to include the second (if applicable) and first levels 106, 104, and finally the runways 130 and terminal structures if any disposed on the top surface 114. The tunnel construction can be performed essentially at any stage during this process 500, but ideally will progress in parallel with the rest of the site 100 so that the fill excavated during the tunnel construction can be used directly in the foundation 120 of the structure 100.

Modularity

It will also be recognized that the various portions of the apparatus 100 of the exemplary embodiment can be made with modularity in mind, such that the configuration of the structure 102 and its components may be altered as dictated by prevailing circumstances. For example, with respect to the monorial/monobeam or other internal transportation system, infrastructure for various different routings and options can be maintained within the structure 100 so that the operation of the system can be adjusted to accommodate different traffic patterns, expansion, dual-uses, etc.

Similarly, equipment and facilities associated with one terminal or system are selected so as to be interchangeable with those of others, thereby allowing reallocation of assets on a dynamic or long-term basis. For example, baggage carriers used with aircraft may be identical to those used with shipping or rail ("one size fits all"). Cargo containers may be similarly standardized. Motors or HVAC equipment used in one terminal is made identical to those in others. This approach of intentional modularity and interchangeability enhances the flexibility of the facility to accommodate more or less of the different types of traffic over time without requiring significant engineering or reconstruction efforts.

Transportation Apparatus Information System

In yet another aspect of the invention, the transportation apparatus 100 can be configured with an integrated wireless data and communications system for ready connectivity by passengers, facility employees, and the like using client devices. In the exemplary embodiment, an ultra-wide bandwidth system of the type known in the communication arts is used. The use of UWB systems prevents interference with aircraft or other communications due to its highly spread spectrum and generally temporally contained air interface. For example, in one configuration, Time-modulated UWB (TM-UWB) systems of the type manufactured by Time Domain Corporation are used as the basis of intra-facility communications. As is well known, high frequency (e.g., GHz-band) TM-UWB has significant ability to penetrate structures and walls, and is largely unaffected by Rayleigh fading, multipath interference, or other deleterious RF phenomenon. The present invention utilizes a series of UWB interfaces or repeaters throughout the various portions of the structure 102 which are positioned so as to provide users with effectively seamless wireless connectivity.

In one alternate embodiment, so called "WiFi" or IEEE-Std. 802.11 based protocols are used as the basis for data and voice connectivity. Alternatively, 3G (e.g., WAP/GPRS) systems can be utilized. Any number of different wireless paradigms (including combinations thereof) can be used to meet the goal of providing personnel within the structure 102 with seamless connectivity without the need to access or "synch up" with a wired terminal, phone jack, etc. This further expedites the passage of travelers through the various terminals of the structure 102; a person can in theory begin a telephone conversation or Internet browse on one transportation modality, and continue it as they board the next without any interruption. It is also useful for facility or security personnel, whereby encrypted wideband channels may be reserved and used for functions such as Homeland Security, policing, 911 calls, etc.

The aforementioned wireless systems may also be connected to internal or external networks including LANs, WANs, MANs, intranets, internets (including the Internet), and so forth.

It is noted that many variations of the methods described above may be utilized consistent with the present invention. Specifically, certain steps are optional and may be performed or deleted as desired. Similarly, other steps may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

Exemplary Multi-runway Analysis (Configuration Table)

Dual Parallel Runways - Even Thresholds - 3000 ft. Spacing

| Weather[1] | Operation | Procedure | Runways |
|---|---|---|---|
| All conditions | Arrivals | Independent | 32R/32L & 14R/14L |
| All conditions | Departures | Independent | 32R/32L & 14R/14L |
| All conditions | Arrivals & Departures | Independent | 32R/32L & 14R/14L |
| ≧1000 & 3 | Arrivals & Departures | Independent (visual separation) | 32R/32R 32L/32L 14R/14R 14L/14L |
| <1000 & 3 | Arrivals & Departures | Dependent | 32R/32R 32L/32L 14R/14R 14L/14L |

[1]Weather values are estimates

Triple Parallel Runways - Even Thresholds - 1500 ft. Spacing

| Weather | Operation | Procedure | Runways |
|---|---|---|---|
| ≧2500 & 3 | Arrivals | Independent (visual separation) | All |
| <2500 & 3 | Arrivals | None | All |
| ≧1000 & 3 | Departures | Independent (visual separation) | All |
| <1000 & 3 | Departures | Dependent | All |
| ≧1000 & 3 | Arrivals & Departures | Independent (visual separation) | All |
| <1000 & 3 | Arrivals & Departures | Dependent | All |

What is claimed is:

1. Integrated transportation apparatus, comprising:
a substantially fixed structure disposed within a low-depth, substantially land-enclosed body of water proximate to at least one local population center, said structure being constructed using dredging operations within said low-depth body of water;
a plurality of runways disposed on said structure in a substantially parallel disposition, said runways being adapted for simultaneous take off and landing of aircraft;
a plurality of taxiways operatively associated with said runways; and
at least one passenger terminal or cargo terminal disposed proximate to at least one of said taxiways;
wherein said structure is disposed at a predetermined orientation with respect to local prevailing winds, at least one military aviation facility, and at least some local residential areas, and disposed proximate at least one local waterborne traffic channel and said at least one military facility; and
wherein said predetermined orientation is selected to at least (i) mitigate interference with said military aviation facility; and (ii) mitigate noise for said residential areas.

2. The apparatus of claim 1, further comprising a tunnel which provides at least one of land vehicle or rail access to said structure, said tunnel being at least partly underground and at least partly under water.

3. The apparatus of claim 1, further comprising a tidal-driven electrical generating apparatus to power at least portions of said structure.

4. The apparatus of claim 1, wherein said structure utilizes local waste fill substantially encapsulated therein, said local waste fill being unsuitable for waterborne disposal.

5. The apparatus of claim 1, further comprising a plurality of berms in peripheral regions of the structure to provide at least one of (i) noise mitigation or (ii) aesthetic impact mitigation, said berms being at least partly raised above the level of said plurality of runways.

6. The apparatus of claim 1, further comprising a monobeam or monorail system operating at least partly within the structure.

7. The integrated transportation apparatus of claim 1, wherein said disposition within a low-depth, substantially land-enclosed body of water allows at least one marine or shipping terminal to be disposed anywhere along a periphery of said apparatus.

8. Integrated transportation apparatus, comprising:
a substantially fixed structure disposed within a low-depth, substantially land-enclosed body of water proximate to at least one local population center, said structure being constructed using dredging operations within said low-depth body of water;
a plurality of runways disposed on said structure in a substantially parallel disposition, said runways being adapted for simultaneous take off and landing of aircraft;
a plurality of taxiways operatively associated with said runways; and
at least one passenger terminal or cargo terminal disposed proximate to at least one of said taxiways;
a plurality of berms in peripheral regions of the structure to provide at least one of (i) noise mitigation or (ii) aesthetic impact mitigation, said berms being substantially raised in elevation with respect to said runway;
wherein said structure is disposed at a predetermined orientation with respect to local prevailing winds and at least some local residential areas, and disposed proximate at least one local waterborne traffic channel and at least one military facility.

9. Integrated transportation apparatus, comprising:
a substantially fixed structure disposed within a low-depth, substantially land-enclosed body of water proximate to at least one local population center;
a plurality of runways disposed on said structure in a substantially parallel disposition, said runways being adapted for simultaneous take off and landing of aircraft;
a plurality of taxiways operatively associated with said runways; and
at least one passenger terminal or cargo terminal disposed proximate to at least one of said taxiways;
wherein said structure is disposed at a predetermined orientation with respect to local prevailing winds and at least some local residential areas, and disposed proximate at least one local waterborne traffic channel and at least one military facility;
wherein said structure substantially restricts the natural tidal flow of water in and out of at least a portion of said low-depth, substantially land-enclosed body of water, thereby prospectively causing unwanted environmental effects on said at least a portion; and
wherein said apparatus further comprises a channel or canal formed within land enclosing said at least a portion, said channel facilitating the interchange of water between said at least portion and open ocean so as to mitigate said unwanted effects.

10. Transportation apparatus, comprising:
a substantially fixed structure disposed within a low-depth, substantially land-enclosed body of water proximate to at least one local city or more than one-million population, said structure being constructed using dredging operations that obtain fill from within said low-depth body of water, said fill being at least partly contaminated to a level that it would not be suitable for release into a body of water;
a plurality of runways disposed on said structure in a substantially parallel disposition, said runways being adapted to permit simultaneous take off and landing of aircraft, said runways further being adapted to support landing and takeoff of at least Boeing 747 aircraft, said runways also configured so as to permit landing and takeoff in either of two directions;
a plurality of taxiways operatively associated with said runways;
at least one passenger terminal or cargo terminal disposed proximate to at least one of said taxiways; and
an at least partly submerged tunnel providing for vehicle passage between said apparatus and said local city;
wherein said structure comprises a substantially longitudinal axis, said runways being disposed substantially parallel with said axis, said axis being disposed at a generally North-West to South-East orientation, said structure being disposed in a predetermined orientation with respect to at least one military aviation facility and at least some local residential areas, and disposed proximate at least one local waterborne traffic channel and said at least one military facility; and
wherein said predetermined orientation is selected to at least (i) mitigate interference with said military aviation facility; and (ii) mitigate noise for said residential areas, said mitigation of noise provided at least in part by said runways being disposed so that noise emanated from the rear of jet engines of aircraft landing on or taking off from said structure is focused primarily over said body of water irrespective of which of said two directions said aircraft use for said landing or takeoff.

11. Integrated transportation apparatus, comprising:

a substantially fixed structure disposed within a low-depth, substantially land-enclosed body of water proximate to at least one local population center;

a plurality of runways disposed on said structure in a substantially parallel disposition, said runways each being at least 10,000 feet in length and adapted for simultaneous take off and landing of aircraft;

a plurality of taxiways operatively associated with said runways; and at least one passenger terminal or cargo terminal disposed proximate to at least one of said taxiways;

wherein said plurality of runways are disposed at a generally North-West to South-East orientation with respect to local prevailing winds, at least one military aviation facility, and at least some local residential areas, and disposed proximate at least one local waterborne traffic channel and said at least one military facility, said North-West to South-East orientation at least (i) mitigating interference with said military aviation facility; (ii) mitigating noise for said residential areas; and (iii) permitting egress of aircraft from said structure after takeoff substantially over said body of water; and wherein said structure comprises a substantially longitudinal axis, said runways being disposed substantially parallel with said axis.

12. The apparatus of claim 11, further comprising a tunnel which provides at least one of land vehicle or rail access to said structure, said tunnel being at least partly underground and at least partly under water.

13. The apparatus of claim 11, further comprising a tidal-driven electrical generating apparatus to power at least portions of said structure.

14. The apparatus of claim 11, wherein said structure utilizes local waste fill substantially encapsulated therein, said local waste fill being unsuitable for waterborne disposal.

15. The apparatus of claim 11, further comprising a plurality of berms in peripheral regions of the structure to provide at least one of (i) noise mitigation or (ii) aesthetic impact mitigation, said berms being at least partly raised above the level of said plurality of runways.

16. The apparatus of claim 11, further comprising a monobeam or monorail system operating at least partly within the structure.

* * * * *